United States Patent [19]
Hayakawa et al.

[11] Patent Number: 5,556,175
[45] Date of Patent: Sep. 17, 1996

[54] SOLENOID VALVE WITH BALL ATTRACTED TOWARDS SEATING BECAUSE OF NEGATIVE PRESSURE

[75] Inventors: Hideyuki Hayakawa, Nishio; Masuhiro Kondoh, Oobu; Makoto Imaeda, Okazaki; Yuzo Imoto, Chita; Kenji Takeda, Okazaki, all of Japan

[73] Assignee: Nippondenso Co., Ltd., Kariya, Japan

[21] Appl. No.: 428,115

[22] PCT Filed: Oct. 28, 1993

[86] PCT No.: PCT/JP93/01569

§ 371 Date: Apr. 28, 1995

§ 102(e) Date: Apr. 28, 1995

[87] PCT Pub. No.: WO94/10487

PCT Pub. Date: May 11, 1994

[30] Foreign Application Priority Data

Oct. 30, 1992 [JP] Japan ................................ 4-292939
Jun. 18, 1993 [JP] Japan ................................ 5-147610

[51] Int. Cl.⁶ .............................................. F16K 31/06
[52] U.S. Cl. ............................ 303/119.2; 251/129.02; 251/129.14
[58] Field of Search ................................ 303/84.1, 84.2, 303/119.2, DIG. 1, 2, 900, 901; 251/129.02, 129.14

[56] References Cited

U.S. PATENT DOCUMENTS

| | | |
|---|---|---|
| 2,614,584 | 10/1952 | Goepfrich . |
| 2,638,118 | 5/1953 | Chandler . |
| 3,719,401 | 3/1973 | Peruglia . |
| 3,836,207 | 9/1974 | Belart . |
| 3,873,063 | 3/1975 | Illing .................................... 251/281 |
| 3,877,758 | 4/1975 | Kuwana . |
| 4,138,165 | 2/1979 | Blomberg et al. . |
| 4,155,603 | 5/1979 | Harries . |
| 4,421,278 | 12/1983 | Keinzle et al. . |
| 4,422,695 | 12/1983 | Farr . |
| 4,558,498 | 12/1985 | Satoh . |
| 4,579,137 | 4/1986 | Brandt, Jr. . |
| 4,640,558 | 4/1987 | Nomura et al. . |
| 4,750,705 | 6/1988 | Zippe . |
| 4,765,693 | 8/1988 | Stegmaier . |
| 4,919,497 | 4/1990 | Kaes ..................................... 303/119.2 |
| 5,076,538 | 12/1991 | Mohr et al. . |
| 5,263,514 | 11/1993 | Reeves ............................... 251/129.07 |

FOREIGN PATENT DOCUMENTS

| | | |
|---|---|---|
| 423755 | 4/1991 | European Pat. Off. . |
| 3914094 | 10/1990 | Germany . |
| 4035817 | 5/1992 | Germany . |
| 63-3582 | 1/1988 | Japan . |
| 64-49779 | 2/1989 | Japan . |
| 2-89881 | 3/1990 | Japan . |

OTHER PUBLICATIONS

Uzawa, "On the Static Characteristics of Circular Disc Valve", (Collected Papers of the Japan Mechanics Association, 2nd Ed. vol. 26, No. 165, May 1960, pp. 691–696) (With English Abstract Enclosed).

Oshima, "Cavitation and Characteristics of Spherical Poppet Valves", Hydraulics and Pneumatics, vol. 23, No. 3, pp. 302–308 (With English Abstract Enclosed) No Date Available.

Primary Examiner—Josie Ballato
Attorney, Agent, or Firm—Cushman, Darby, & Cushman

[57] ABSTRACT

When oil flows from within a seat valve along an oil path in a valve, structure is such that a negative pressure is generated to draw a ball in the direction of the seat valve. That is, the force in the direction of valve closure is actively utilized, the valve does not perform a full stroke in a certain differential pressure range, and increases in a pulsed manner in a minute-stroke state, i.e., in a state where the passage cross-sectional area of the valve is small. Therefore, effective control becomes possible without a large pressure increase.

22 Claims, 31 Drawing Sheets

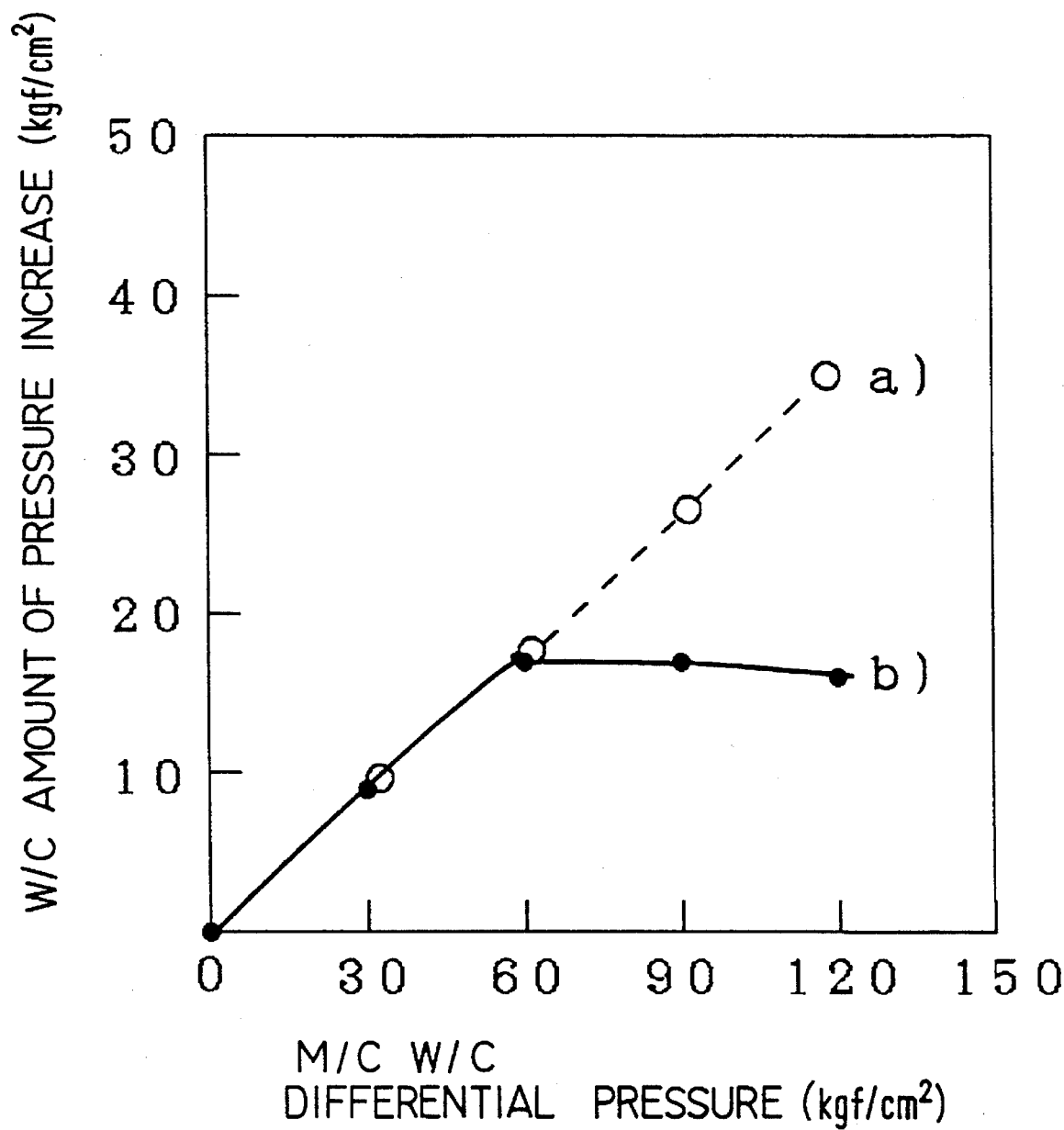

SOLENOID VALVE WITH BALL ATTRACTED TOWARDS SEATING BECAUSE OF NEGATIVE PRESSURE

BACKGROUND OF THE INVENTION

1. Field of the Invention

The present invention relates to a solenoid valve, and more particularly, to a solenoid valve which is particularly effective for brake-pressure control of an anti-lock brake system (ABS) for vehicle use.

2. Description of the Related Art

In brake-pressure control according to an ABS, as shown in FIG. 3, when rotation of a tire shows a tendency to lock, hydraulic pressure in a wheel cylinder is reduced by opening a reducing solenoid valve 102, and when the rotation of the tire resumes, the hydraulic pressure in the wheel cylinder is increased in a step-like fashion by opening a pressure increasing solenoid valve 101 for a few milliseconds periodically responsive to a pulse driving signal. If the cross-sectional area of the pressure increasing solenoid valve 101 is large, since an amount of the pressure increase per pulse signal becomes large, hydraulic pulsation increases and the tire easily reaches a lock-up state. Conventionally, in order to prevent the above problems and to increase a suitable amount of the hydraulic pressure in the brake-pressure control, a control orifice inside the pressure increasing solenoid valve 101 has been provided.

However, the control orifice increases the passage resistance between a master cylinder (M/C) and wheel cylinder (W/C) during normal braking operations, and thereby it causes a problem in which a long time delay until the braking operations take effect is introduced and it lowers the quality of the brake feeling. In an attempt to provide a device solving the above problems, Japanese Unexamined Patent Publication No. 64-49779. teaches that during normal braking operations, a hydraulic pressure valve is maintained in a wide-open state by holding a movable member with a permanent magnetic holding device. During brake-pressure control by the ABS, the movable member is separated from the holding device by means of electromagnetic power. After that, when the brake fluid flows through an inflow area installed a globe-shaped sealing member, a suction effect is created on the sealing member. Furthermore, when the brake fluid flows through holes formed in a sealing support member, a pressure difference is created between upper and bottom surfaces of the movable member, and a suction effect is created on the bottom surface of the movable member. Due to the suction effects, the valve does not open completely but moves within a narrow range. Therefore, it is possible to improve controllability of the brake fluid pressure and prevent time delay of the normal braking operations.

However, the above device is required to provide the permanent magnetic holding device not to create the suction effect on the bottom surface of the movable member during the normal brake operations. Also, additional electromagnetic power is required to remove the movable member from the holding device. Therefore, use of the device makes construction of the solenoid valve complex and increases its size.

SUMMARY OF THE INVENTION

The present invention is made in light of the foregoing problems, and it is an object of the present invention to provide a solenoid valve which has a simple structure without adding unnecessary components, which can prevent time delay of normal braking operations by enlarging the cross-sectional area of a oil pressure control valve during normal braking operations, and which can improve controllability of the ABS by making the cross-sectional area small during brake-pressure control by the ABS.

For attaining the above object, a solenoid valve according to the present invention is constructed so that a negative pressure is formed when fluid flows through an area between a seat member with a tapered surface and a communication interruption member which has a spherical face and which is pressed by a moving member which moves responsive to electromagnetic power, and the negative pressure attracts the communication interruption member toward the tapered face, characterized in that the communication interruption member and the moving member are disposed in the same space, and the negative pressure is formed only between the communication interruption member and the seat member when the fluid flows out of the space.

Because of the above construction, the solenoid valve according to the present invention can prevent a time delay of the normal brake operations and suitably control an increasing pressure amount during brake-pressure control by the ABS simply because specifications of a ball valve member in the solenoid valve are determined within the above values without the inclusion of additional components. Also, because the cross-sectional area of the fluid path is narrow, the fluctuation of the amount of fluid flowing through the valve is small, and thereby hydraulic pulsation due to hydraulic pressure impact is also small and operating noise of the ABS which occurs due to hydraulic pressure impact can be reduced.

BRIEF DESCRIPTION OF THE DRAWINGS

FIG. 7 (b) is a time chart indicates change in W/C pressure according to the embodiment;

FIG. 8 is a characteristic diagram indicating a relationship between M/C-W/C differential pressure and W/C pressure increase;

FIGS. 21 through 26 and 29 through 32 are sectional views indicating structures and modes of operation according to other embodiments;

BEST MODE FOR CARRYING OUT THE INVENTION

The embodiments according to the present invention will be described in detail hereinafter with reference to the drawings.

Figure 1:
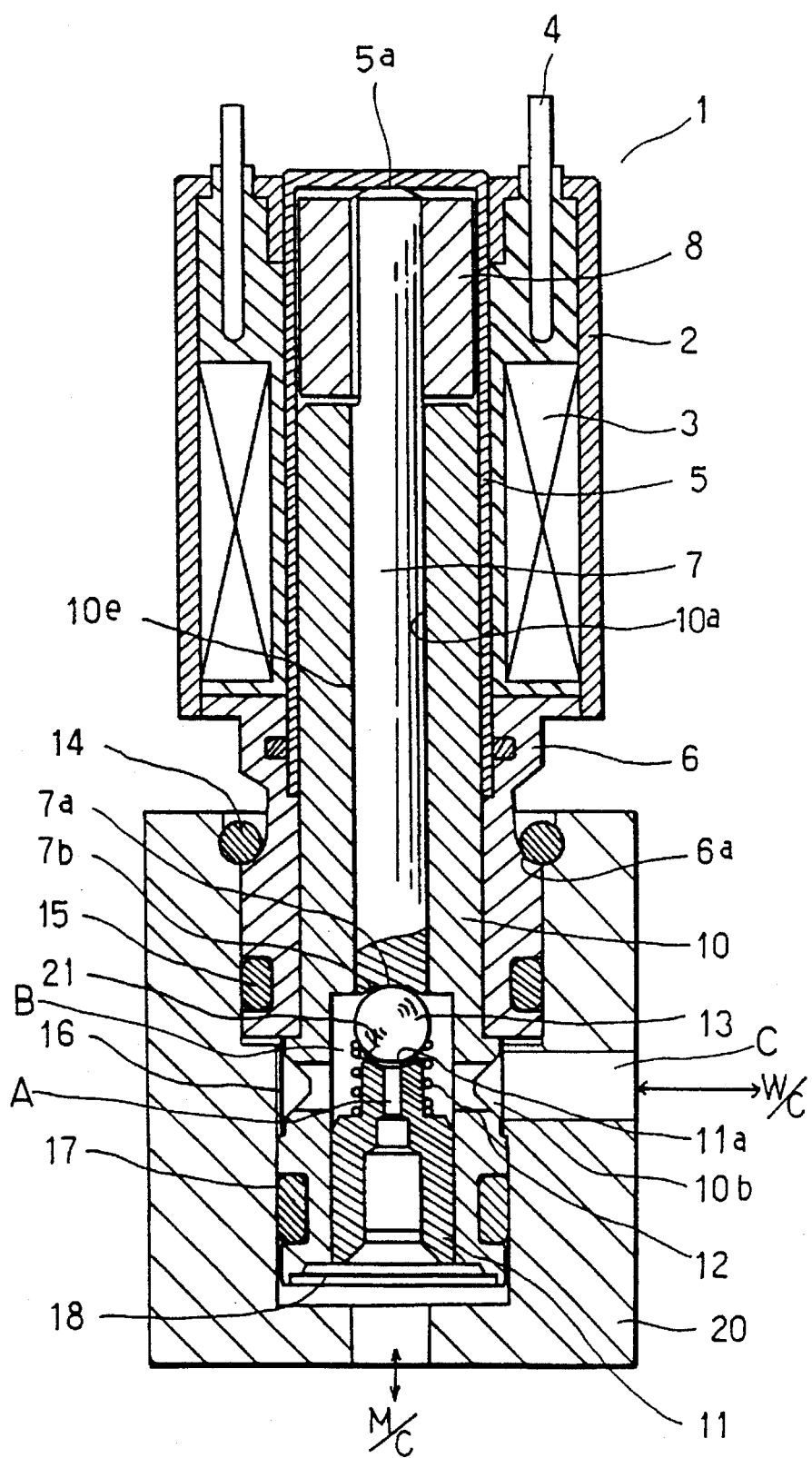
FIG. 1 is a cross-sectional view indicating a whole structure of a solenoid valve 1.

FIG. 1 shows a solenoid valve 1 according to the present invention. A coil 3 is installed inside a yoke 2, and is energized via a lead wire 4. There is a sleeve 5 made of a nonmagnetic material inside the coil 3, fixed to be oil-tight to a core stator 6 which is made from a magnetic material. A guide 10 is press-fit inside the core stator 6. There is a plunger 8 which is a movable iron core in the upper interior portion of the sleeve 5, a magnetic-body shaft 7 is press-fit therein, and an outer periphery of the shaft 7 has a predetermined gap 10e with respect to an inner surface 10a of the guide 10 to be slidable therein. Therefore, upper and lower end surfaces of the moving member composed of the plunger 8 and the shaft 7 are subject to the same hydraulic pressure. A seat valve 11 is press-fit into the lower interior portion of the core stator 10, and a ball 13 opens and closes an oil path by blocking a seat surface 11a thereon. An upper portion of the ball 13 is in contact with a flat portion 7a on a lower portion of the shaft 7, the shaft 7 and the integrally moving plunger 8 being pressed upwardly by a spring 12 installed on the seat valve 11, and contacting an upper inside surface 5a of the sleeve 5. The clearance between the seat surface 11a and ball 13 at this time is 0.2 mm or more.

There is a flat portion 7a at a lower end portion of the shaft 7 applying force only downwardly to the ball 13, and also lateral movement of the ball 13 is restricted by a tilted surface 7b; the ball 13 is not laterally displaced from the shaft 7 and seat surface 11a. Additionally, a filter 18 is installed on a lowermost end portion of the guide 10 and a filter 16 is installed on a side surface 10b of the guide 10, preventing penetration of foreign matter into the solenoid valve 1 from the M/C and W/C, respectively. In addition, the solenoid valve 1 is fixed to a housing 20 by a C-ring 14 installed in a concavity portion 6a of the guide portion, and is oil-sealed by 0-rings 15, 17. A in the drawing indicates a first space formed in the seat valve 11, B indicates a second space containing the shaft 7, plunger 8 and ball 13, and C indicates an exit port through which the brake fluid flows from the second space B to the W/C.

Because the oil-path pattern of this solenoid valve is an L-type with entry from an axial direction and exit in a radial direction, the solenoid valve has a structure which can be mounted from one direction with respect to the housing.

Operation of the solenoid valve 1 will be described next.

When electrical current is caused to flow to the coil 3 of FIG. 1, magnetic flux passes through the yoke 2, core stator 6, guide 10, and plunger 8, electromagnetic force is generated so that the plunger 8 and guide 10 approach, overcomes the spring force and hydraulic force to move downwardly, the ball 13 contacts the seat surface 11a, and the oil path between the M/C and W/C is interrupted. When current is cut, the electromagnetic force disappears, there is movement by the spring force and hydraulic force ultimately to the original position, and the oil path between the M/C and W/C is reestablished.

The forces applied to the valve will be described hereinafter. Firstly, according to Uzawa in "On the Static Characteristics of Circular Disc Valve" (Collected Papers of the Japan Mechanics Association, 2nd edition, vol. 26, No. 165, May 1960, pp. 691–696), with regard to a flat circular valve the fluid force applied to the valve is calculated, and it is explained theoretically that a fluid attracting action is generated in the valve, and the valve steadily balances in a minutely opened state. This fluid attracting action is due to the generation of force whereby a differential pressure of the upper and lower surfaces of the valve is produced by the pressure of the portion where the flow velocity of the valve seat portion is fast dropping below the pressure of the portion of the upper surface of the valve, according to Bernoulli's theorem. Additionally, according to Oshima in "Cavitation and Valve Characteristics in Spherical Poppet Valves" (Hydraulics and Pneumatics, vol. 23, No. 3, pp. 302–308), the pressure distribution of a spherical valve was measured, and it is indicated that even in a spherical valve, the pressure applied to the valve in the proximity of the valve seat portion drops below the pressure surrounding the valve. Because of this, it is verified that a force component is generated in the direction of the valve seat, i.e., in the direction in which the valve closes.

The present embodiment applies a phenomenon generated on a flat circular valve to a hydraulic pressure control valve for ABS use, on the basis of these facts. That is to say, in the hydraulic pressure control valve for ABS use, an attracting effect of fluid is actively utilized with regard to a ball and a valve seat of a conical tapered surface which are simple and have excellent fluid sealing characteristics, which are particularly critical matters. According to the present embodiment, the force in the direction of valve closure is actively utilized, the valve does not perform a full stroke in a certain differential pressure range during ABS control, and the hydraulic pressure in the wheel cylinder is increased in a step-like fashion in a minute-stroke state, i.e., in a state where the passage cross-sectional area of the valve is small, and so favorable ABS control becomes possible without the amount of pressure increase becoming large.

Figure 2:
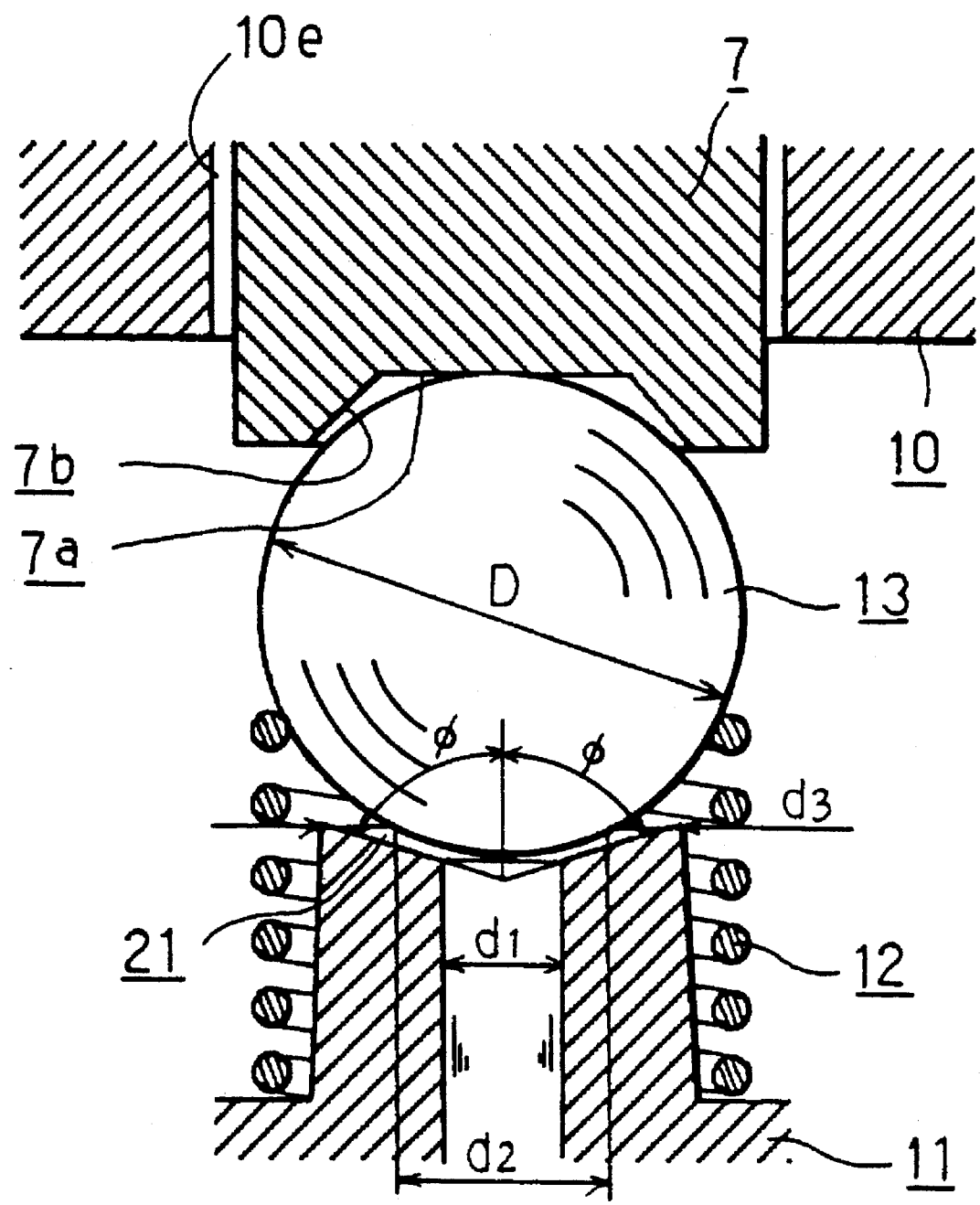
FIG. 2 is an enlarged detail view of a portion of FIG. 1.
Figure 3:
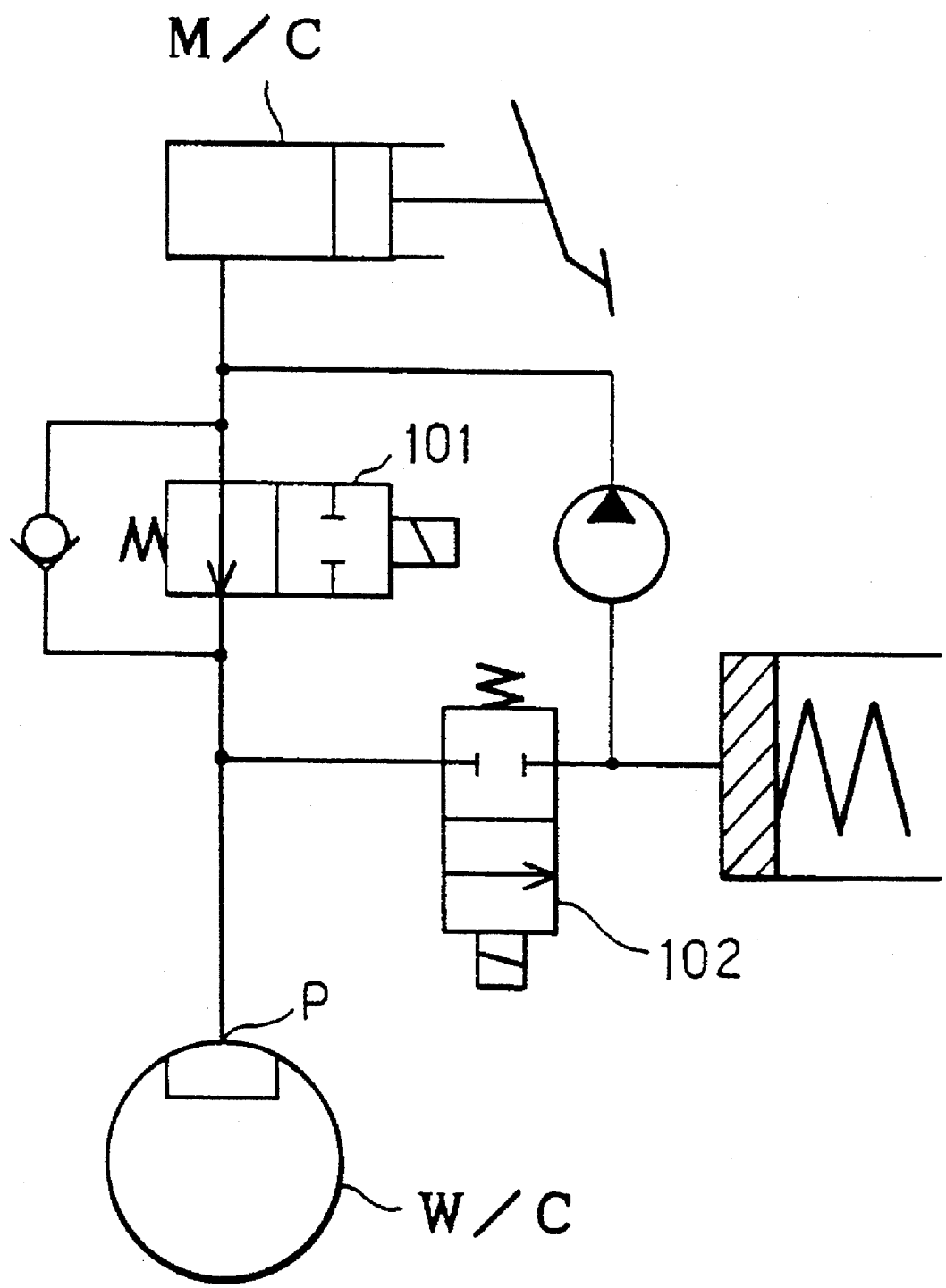
FIG. 3 is a view of the prior art, indicating a hydraulic circuit of an ABS.

FIG. 2 is an enlarged view of a ball valve portion of a solenoid valve according to the present embodiment. The valve specifications are expressed as ball diameter: D, seat angle $\Phi$, seat hole diameter: d1, seat diameter: d2 (=Dcos $\Phi$), and seat end face diameter: d3. d1 is selected to be a diameter where there is no application lag in normal braking (in a solenoid valve for ABS use, it is preferred to make this $\Phi$0.7 mm or more). d2 is expressed by d2=d1+S, and S is taken to be a size (for example S>0.03 mm) where there is no problem with the sealing of the ball even if a corner portion cannot be machined to an aimed form and the corner position is shaved due to machining at this time, d2 becomes d2>0.76 mm. In a case where d2 is fixed, the seat angle $\Phi$ is readily determined according to the ball diameter D from the relational expression $\Phi=\cos^{-1}(d2/D)$. It is preferred that the set load of the spring 12 is small because force in the direction of valve opening becomes small, but according to experimentally confirmed results, a spring force within a range of 150 g to 900 g is acceptable.

Figure 7A:
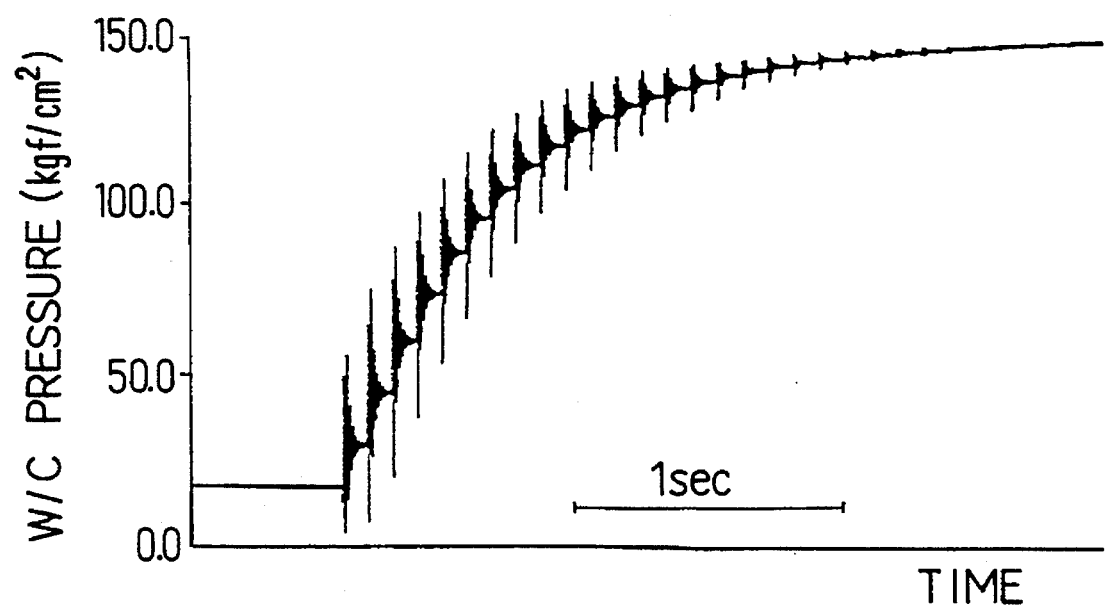
FIG. 7 (a) is a time chart indicates change in W/C pressure according to the prior art.
Figure 7B:
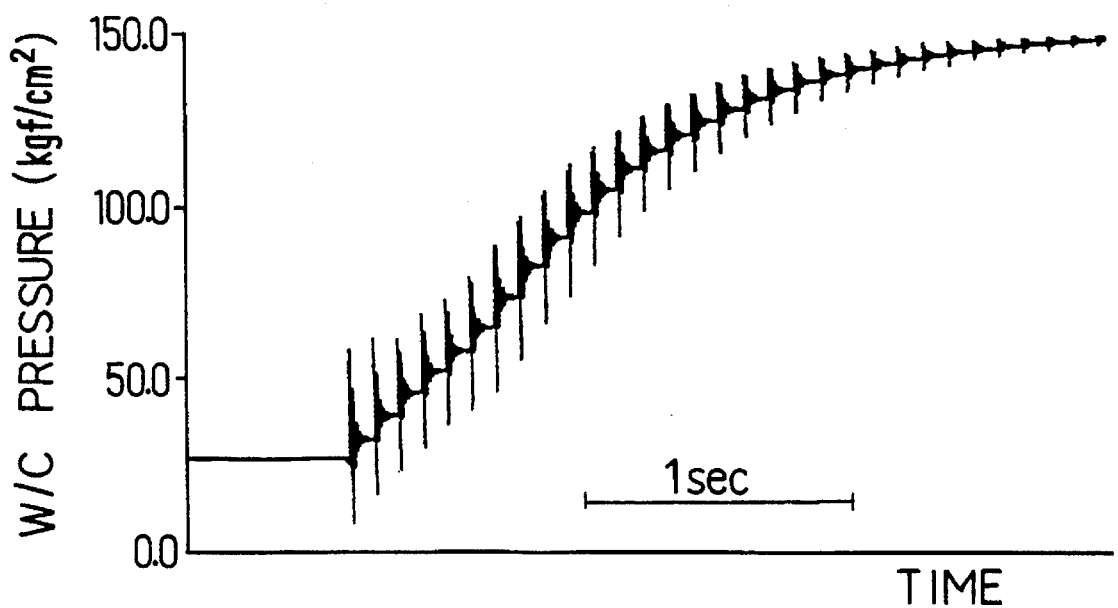
Figure 29B:
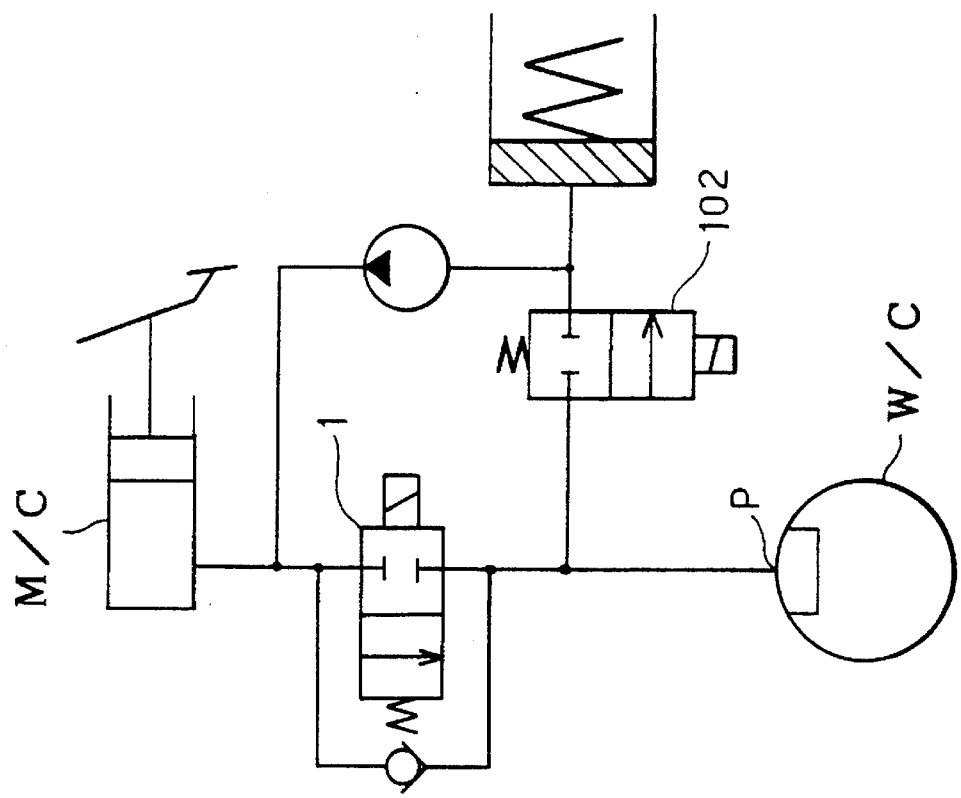
FIGS. 29(a) and 29(b) are diagrams of an ABS system using a valve according to the present invention.
Figure 29A:
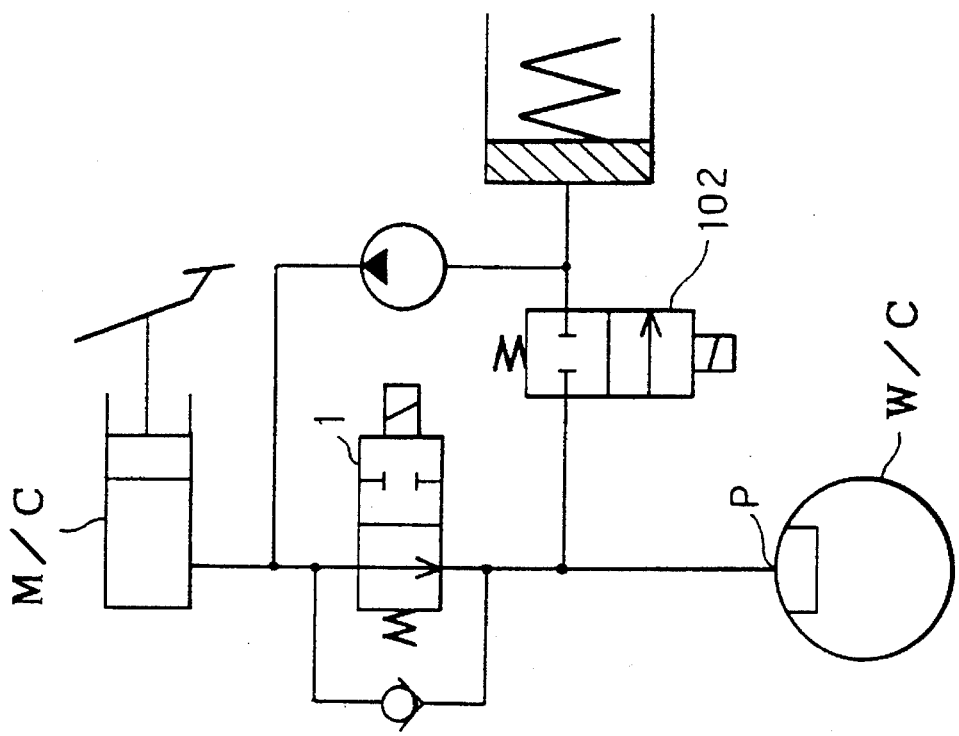

FIGS. 29 (a) and 29 (b) show a hydraulic circuit using a solenoid valve according to the present invention as a solenoid valve 101 for pressure-increase use. When the solenoid valve opens (FIG. 29 (a)) or closes (FIG. 29 (b)) in a pulsed manner, hydraulic pulsation is generated as shown in FIG. 7 when the pressure (W/C pressure) of area P in the drawing increases in a pulsed manner. Piping vibrations and brake-torque fluctuations of the vehicle are generated by this hydraulic pulsation, and operation noise is generated during ABS operation.

Figure 4:
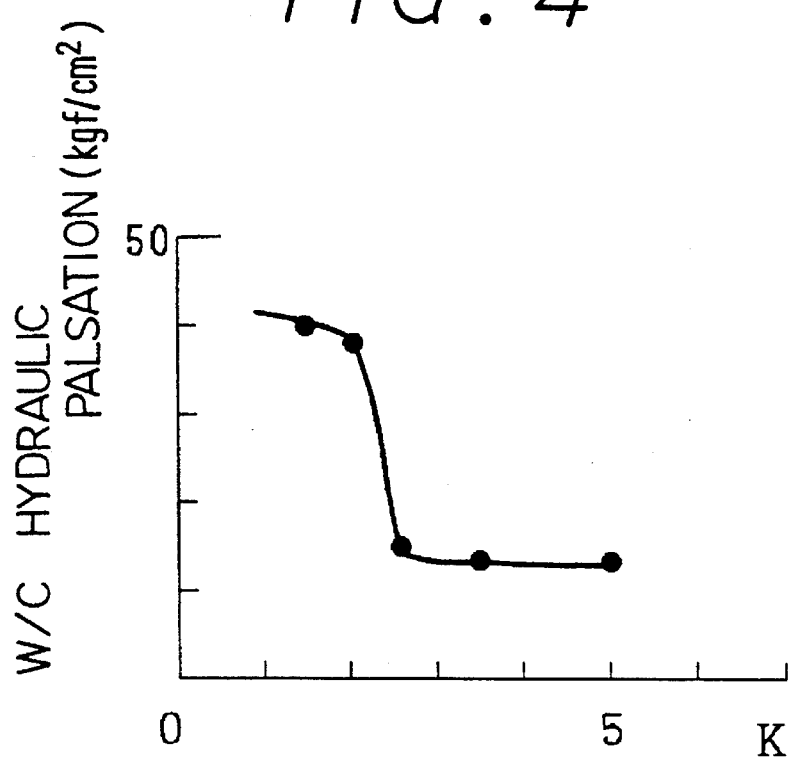
FIG. 4 is a characteristic diagram indicating a relationship between K and W/C hydraulic pulsation.

When d3=Φ2.8 mm, FIG. 4 indicates experimental results of hydraulic pulsation in a case where the ratio of ball diameter to seat diameter K=D/d2 is taken to be a parameter and the differential pressure of M/C and W/C is 120 kgf/cm². According to this, hydraulic pulsation increases suddenly when K>2.2, and so it is preferred to make K>2.2.

Figure 5:
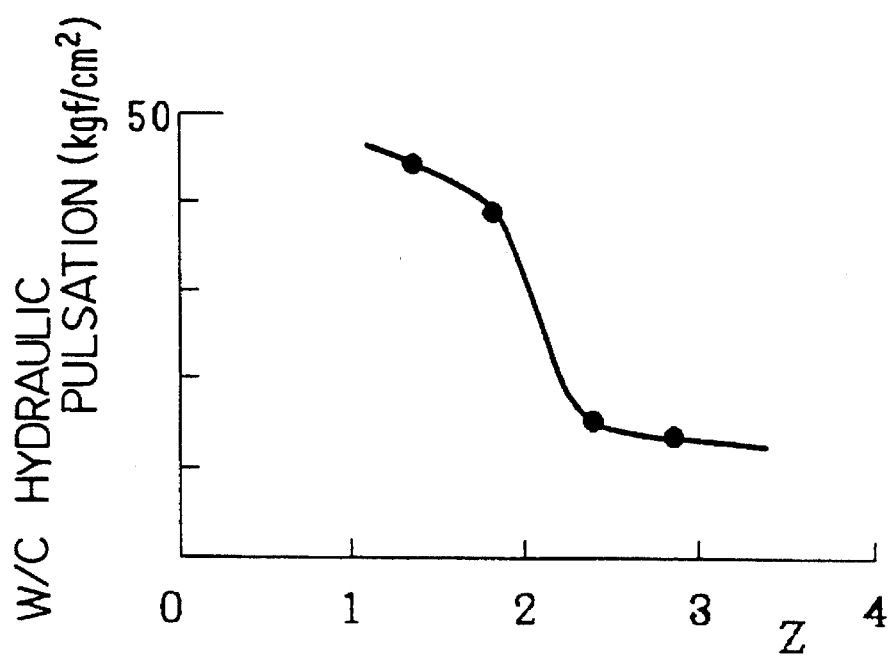
FIG. 5 is a characteristic diagram indicating a relationship between Z and W/C hydraulic pulsation.

FIG. 5 shows hydraulic pulsation for the parameter Z=d3/d2, which relates to the length of the seat surface. According to this figure, it is preferable that Z>1.9.

Figure 6:
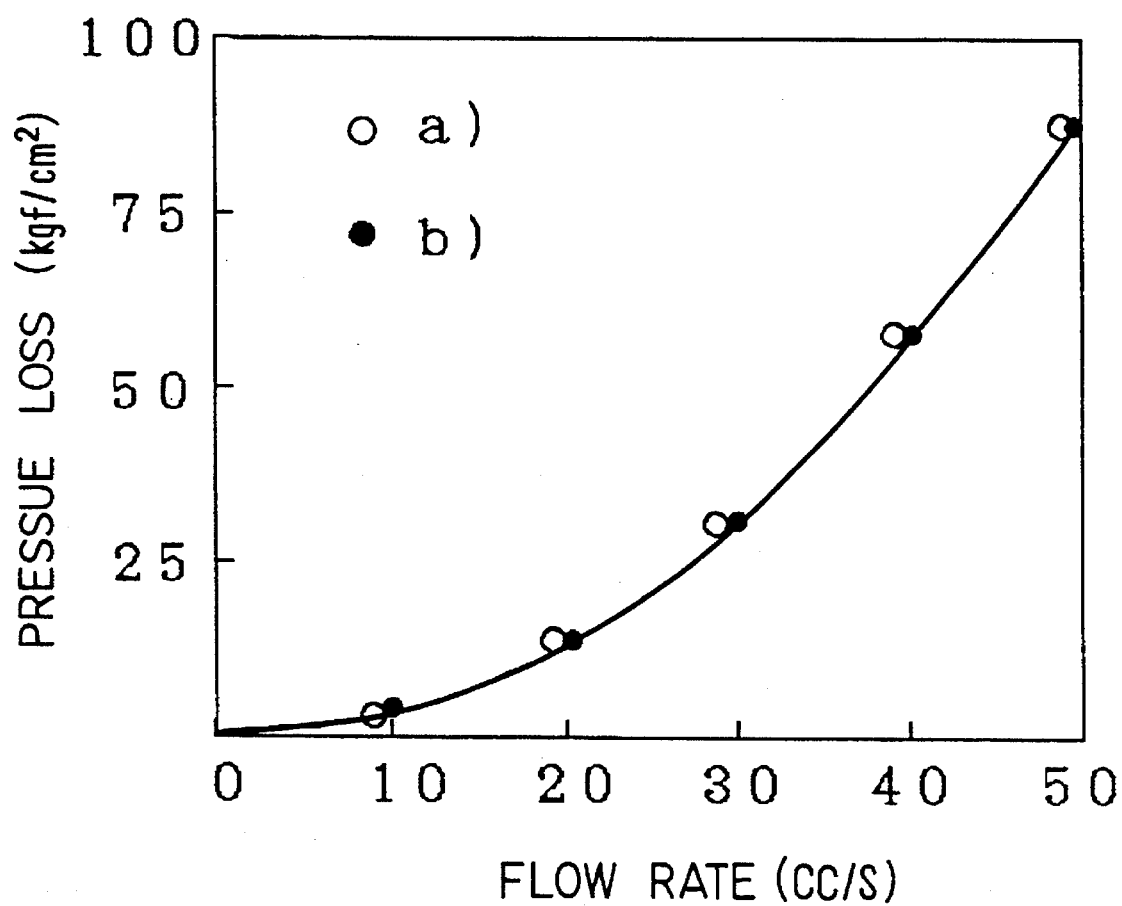
FIG. 6 is a characteristic diagram indicating a relationship between flow rate and pressure loss.

FIG. 6 indicates the differential pressure—flow characteristics of the solenoid valve in a state of an OFF state (normal-open) of the solenoid valve where d1=Φ0.7 mm and d2=Φ1.0 mm, of a) D=Φ1.5 mm and b) D=Φ5.0 mm. According to this figure, when the solenoid valve is off, the ball valve performs a full stroke and the stroke of the valve is large from the start, and so there is no attracting effect of fluid up to drawing back the valve, and there is no restriction of the passage cross-sectional area of the valve seat portion. Consequently, the solenoid valve (b) within the range of effect of the present embodiment exhibits flow characteristics identical to the solenoid valve (a) outside the range of effect of the present embodiment, and because of this it is understood that there is no application lag in normal braking.

FIGS. 7 (a) and 7 (b) indicates measurements of amount of pressure increase of three pulses of the W/C. FIG. 7 (a) shows the operation of a solenoid valve of ball-valve specification according to the prior art, and FIG. 7 (b) shows the operation of to a solenoid valve according to the present embodiment. As shown by these graphs, in a solenoid valve according to the present embodiment, application lag during normal braking can be avoided and the amount of pressure increase during ABS control can be controlled appropriately by selecting specifications of the ball valve portion within the foregoing range of values with no particular addition of structure; also, because operation is performed in a state where the passage cross-sectional area is small, flow fluctuations become small, hydraulic pulsation due to hydraulic pressure impact can also be made smaller, and ABS operation noise generated by hydraulic pulsation can be reduced.

Figure 9:
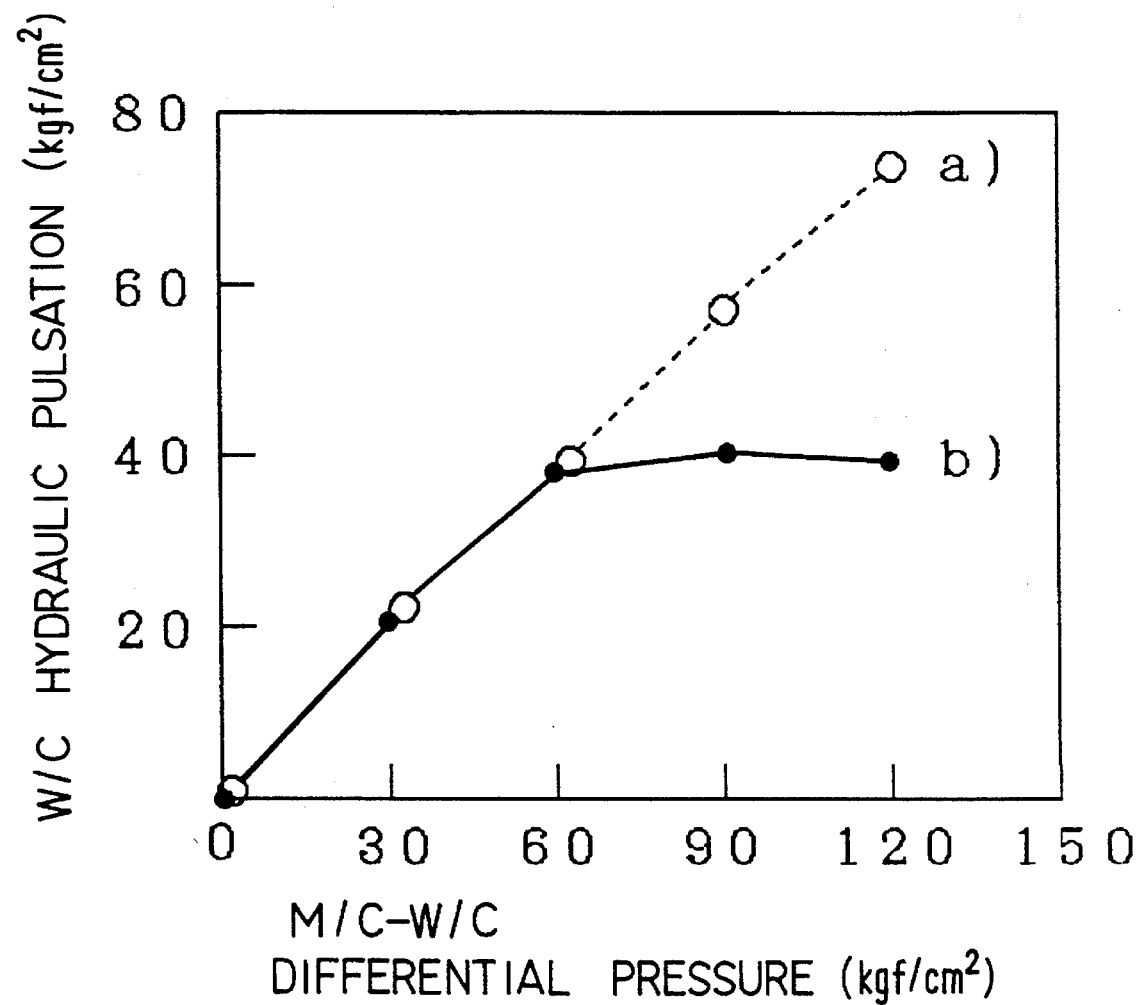
FIG. 9 is a characteristic diagram indicating a relationship between M/C-W/C differential pressure and W/C hydraulic pulsation.

FIG. 8 and FIG. 9 illustrate other features of the present embodiment. Briefly, the amount of pressure increase (FIG. 8) and pulsation (FIG. 9) of the W/C with regard to the differential pressure ΔP=PM/C–PW/C of the M/C and W/C are taken from FIGS. 7 (a) and 7 (b). In a solenoid valve according to the prior art ((a) in the drawings), the amount of pressure increase is determined according to the opening cross-sectional area of the orifice, and as the differential pressure becomes larger the amount of pressure increase also rises. In contrast to this, in a solenoid valve according to the present invention ((b) in the drawings), when the differential pressure becomes large, the attraction force applied to the ball valve rises, the opening cross-sectional area of a valve seat portion 21 is smaller than the opening cross-sectional area of the opening portion 19a of the orifice 19, because the amount of pressure increase reaches a plateau, the amount of pressure increase of the W/C can be maintained substantially uniformly even if the differential between the M/C pressure and W/C pressure becomes large. Because of this, even if the brake pedal is depressed in a manner which causes the M/C pressure to change during ABS operation, the amount of pressure increase of the W/C pressure is not varied by the absolute value of the M/C pressure, and so stabilized ABS control is possible, and because hydraulic pulsation also generally becomes larger if the amount of pressure increase becomes larger, there is also the outstanding effect whereby ABS operation noise in a case of large M/C pressure also becomes smaller.

As has been described above, according to the present embodiment application lag during normal braking can be avoided, the amount of pressure increase during ABS control can be optimized, and ABS operation noise can be reduced by selecting specifications of the ball valve within the range of the present invention with no additional structure, thereby making it possible provide a to simple, high-performance solenoid valve.

(Other Embodiment)

Figure 10:
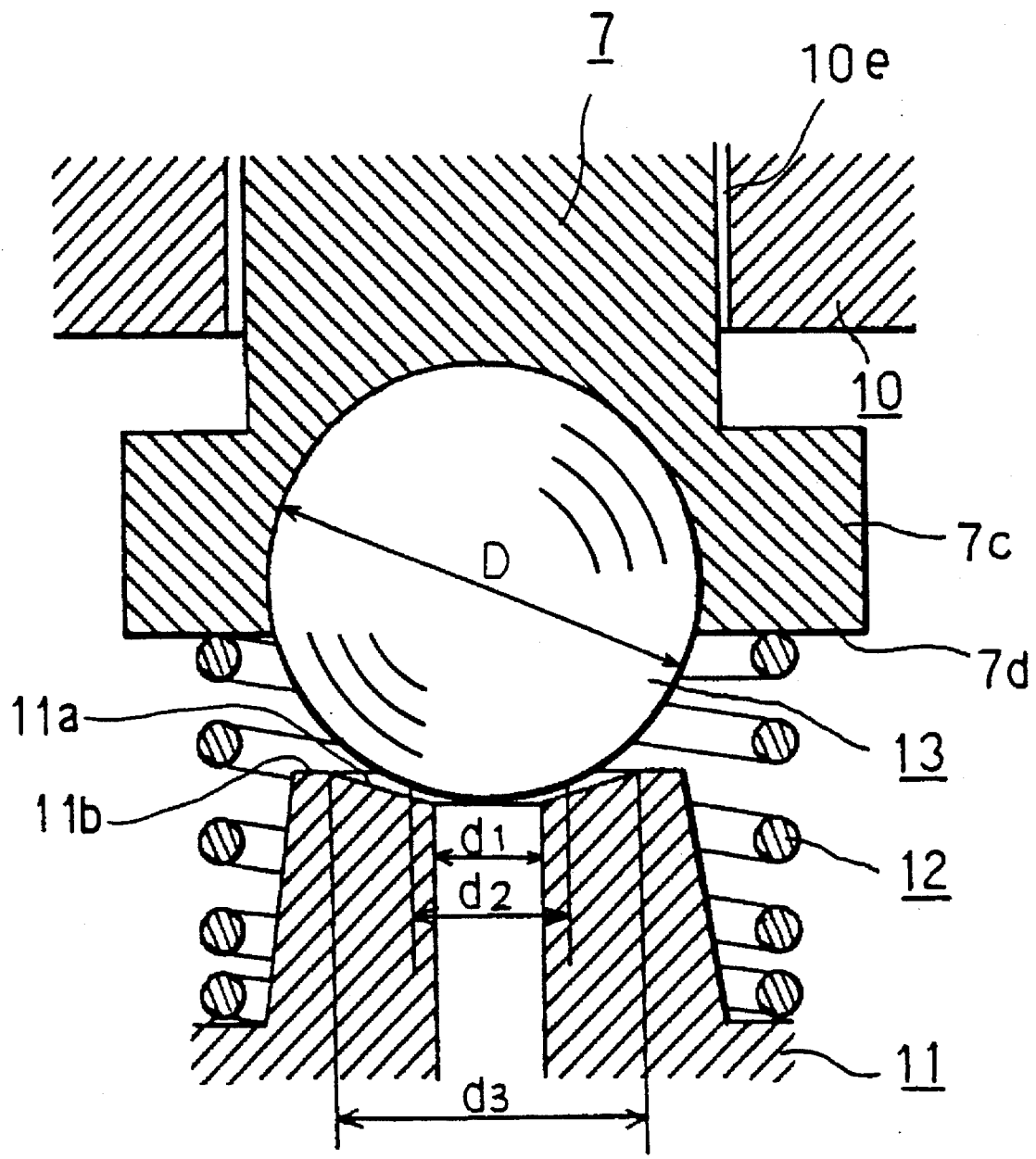
FIGS. 10, 11 and 14 through 19 are sectional views indicating structures according to other embodiments.

FIG. 10 illustrates an embodiment in which ball 13 is fixed to the lower end portion 7c of the shaft 7 and which has a different seat-valve configuration. That is to say, there exists a flat portion 11b on the outer periphery of the seat surface 11a of the seat valve 11. In this case, seat configuration d3 is as shown in the drawing. The spring 12 is supported by a lower end portion 7d of the shaft 7.

Figure 11:
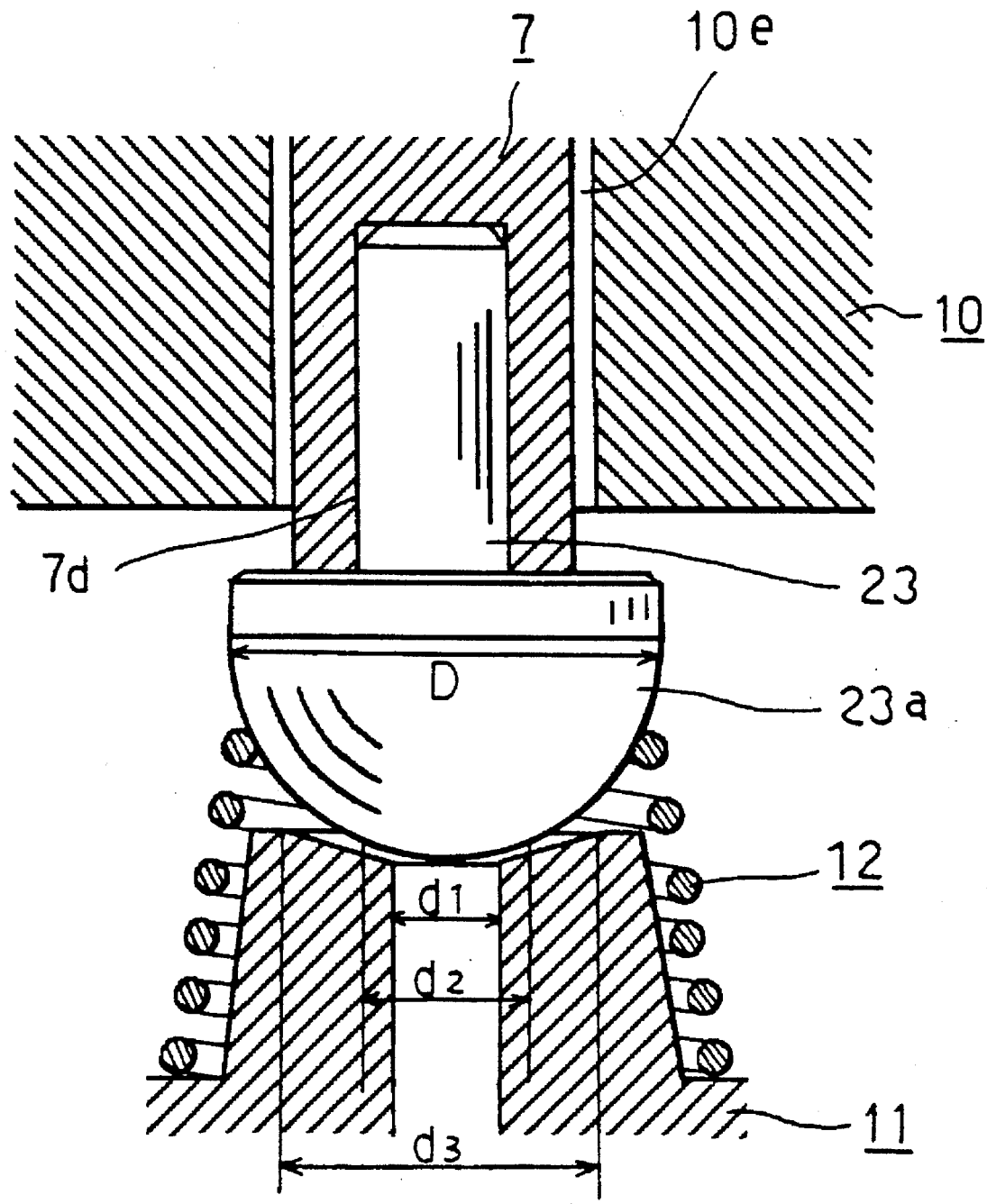

FIG. 11 illustrates another embodiment where an end of a rod 23 is machined into a sphere 23a and press-fit into a hole 7d on the shaft 7. According to this embodiment, the rod 23 corresponding to a comparatively large ball diameter can be linked to the shaft 7, the shaft diameter can be made narrower, the moving-portion weight decreases. Along with these effects, the inner diameter of the guide becomes smaller, the attracting surface area of electromagnetic force is made larger, and responsiveness increases.

Figure 12:
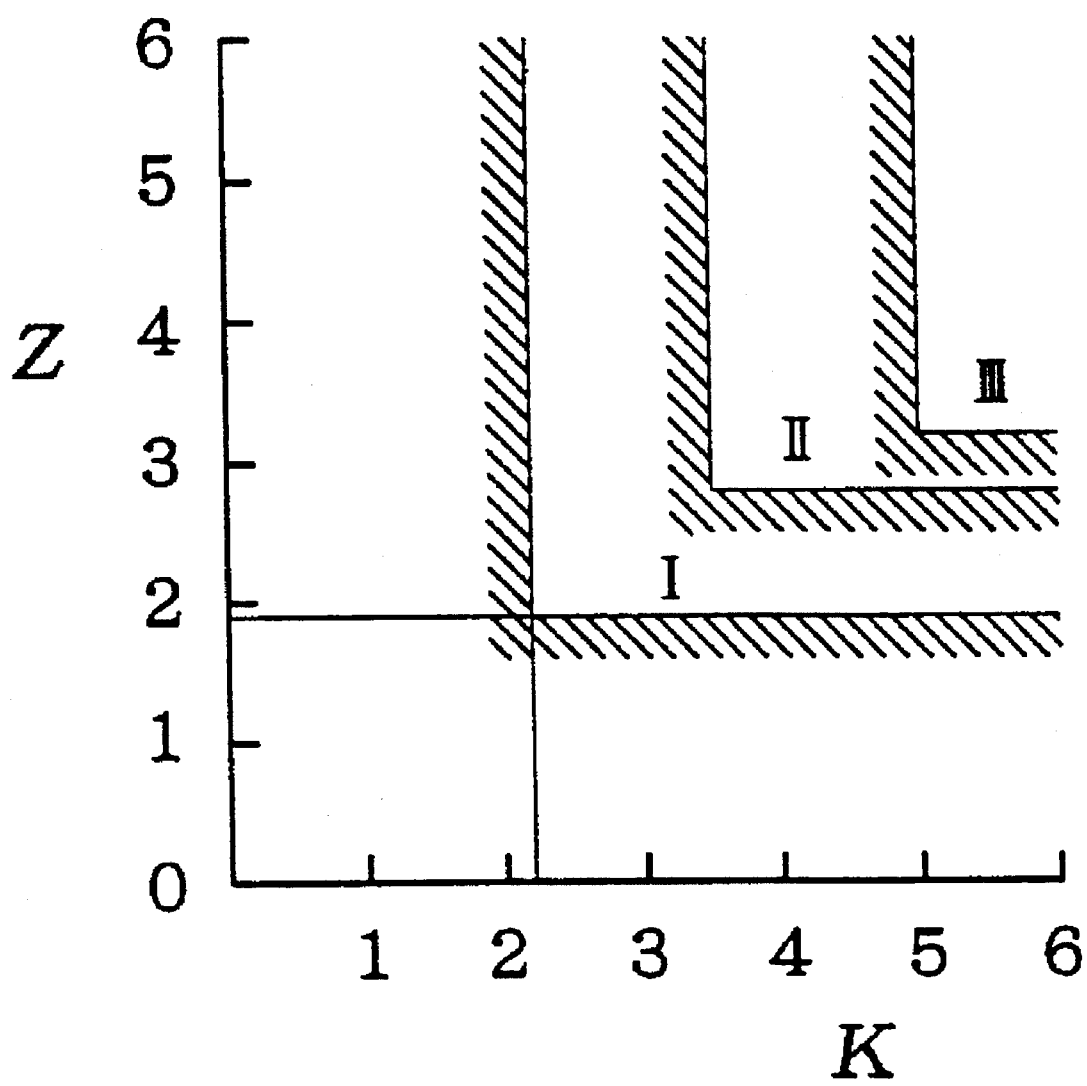
FIG. 12 is a characteristic diagram indicating a relation between parameters K and Z.

FIG. 12 shows the relationship of parameters K and Z according to the above-described embodiments. According to the foregoing embodiments, it is preferable that K>2.2 and Z>1.9, but if considered with reference to FIG. 9, if values of K=3.5 to 5 or more and Z=2.8 to 3 or more are used where hydraulic pulsation becomes particularly small according to FIG. 4 and FIG. 5., the effects according to the present invention increase further, and so the range from region I to regions II and III is taken to be the recommended region. In practical use, this is particularly effective in a case where $d_2=\Phi 0.66$ to $\Phi 1$ mm $(>d_1+S)$ and ball diameter $D=\Phi 3.5$ to $\Phi 5$ mm are established in correspondence with valve seat hole diameter $d_1$.

Figure 13:
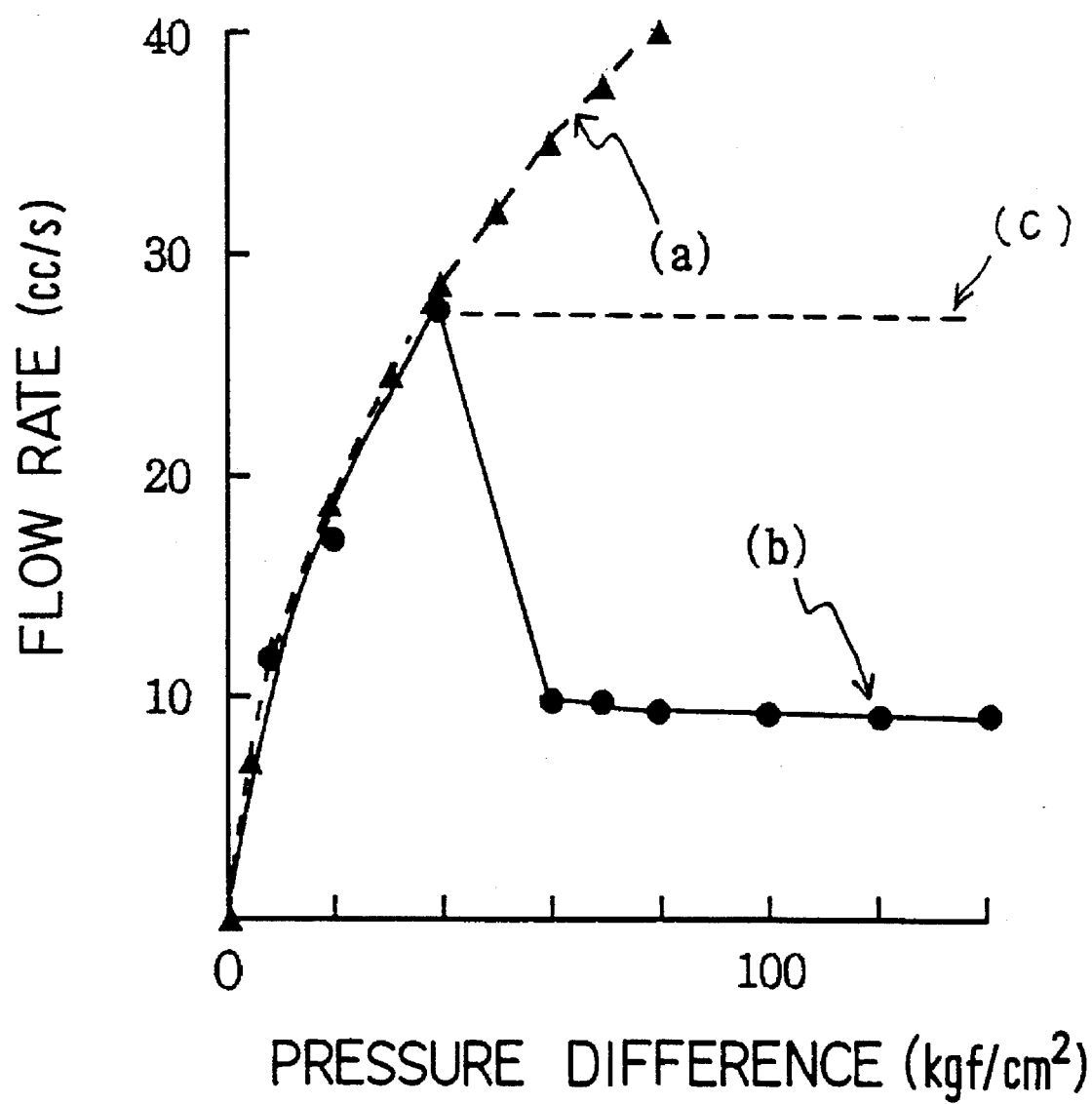
FIG. 13 is a characteristic diagram indicating a relationship between pressure differential and flow amount.

FIG. 13 shows pressure differentials and flow characteristics according to the above-described embodiments. In these characteristics the spring load is established at a value smaller than during the experimentation indicated in FIG. 6.

(a) shows characteristics of only the valve seat hole (diameter $d_1$) with, for example, the ball valve indicated in FIG. 2 removed. (b) shows experimental results where a ball and spring are installed. According to these results, during normal braking the ball is separated from the valve seat by the spring, similarly to FIG. 6 described above, and so attraction (drawing) of the ball does not occur and there is no restriction of the oil path between the ball and seat, but when ABS control is initiated, the ball moves in the direction of the seat and so in a case where the ball opens from a closed state due to electromagnetic force in the ABS, drawing occurs at the moment of opening and there is restriction between the ball and seat. That is to say, the valve maintains flow substantially uniformly without opening fully even if the pressure differential becomes large, and as shown in the foregoing FIG. 8, uniform pressure-increase characteristics are obtained with no dependence on the pressure differential of the M/C and W/C.

A noteworthy matter here is that whereas a general flow control mechanism provides characteristics such as are indicated in FIG. 13 (c) because of controlling uniform flow as was described earlier, according to the present invention, results as indicated in (b) are obtained, and so there are an outstanding effect whereby the amount of pressure increase during ABS control becomes extremely small and hydraulic pulsation is also reduced.

A further modification with respect to a valve of a ball and a simple tapered seat will be described next.

Firstly, the dimensions relating to the configuration of the valve are:

When receiving-pressure diameter is $d_2$ (=Dcos Φ),

Receiving-pressure surface area $A_2 = \pi/4 d_2^2$,

Typical diameter of the valve $d_4$ (=D in a case of ball alone),

At this time,

Attracting surface area $A_{4f} = \pi/4 d_4^2$,

Actual attracting surface area $A_4 = A_{4f} - A_2$, and

Attracting surface area/receiving-pressure surface area ratio $B = A_4/A_2$.

Relatively, 1) increasing the flow velocity of the valve lower surface to reduce pressure according to Bernoulli's law; and 2) increasing the actual attracting surface area of the valve (making $A_4$ larger), are effective to increase the attraction force.

Figure 14:
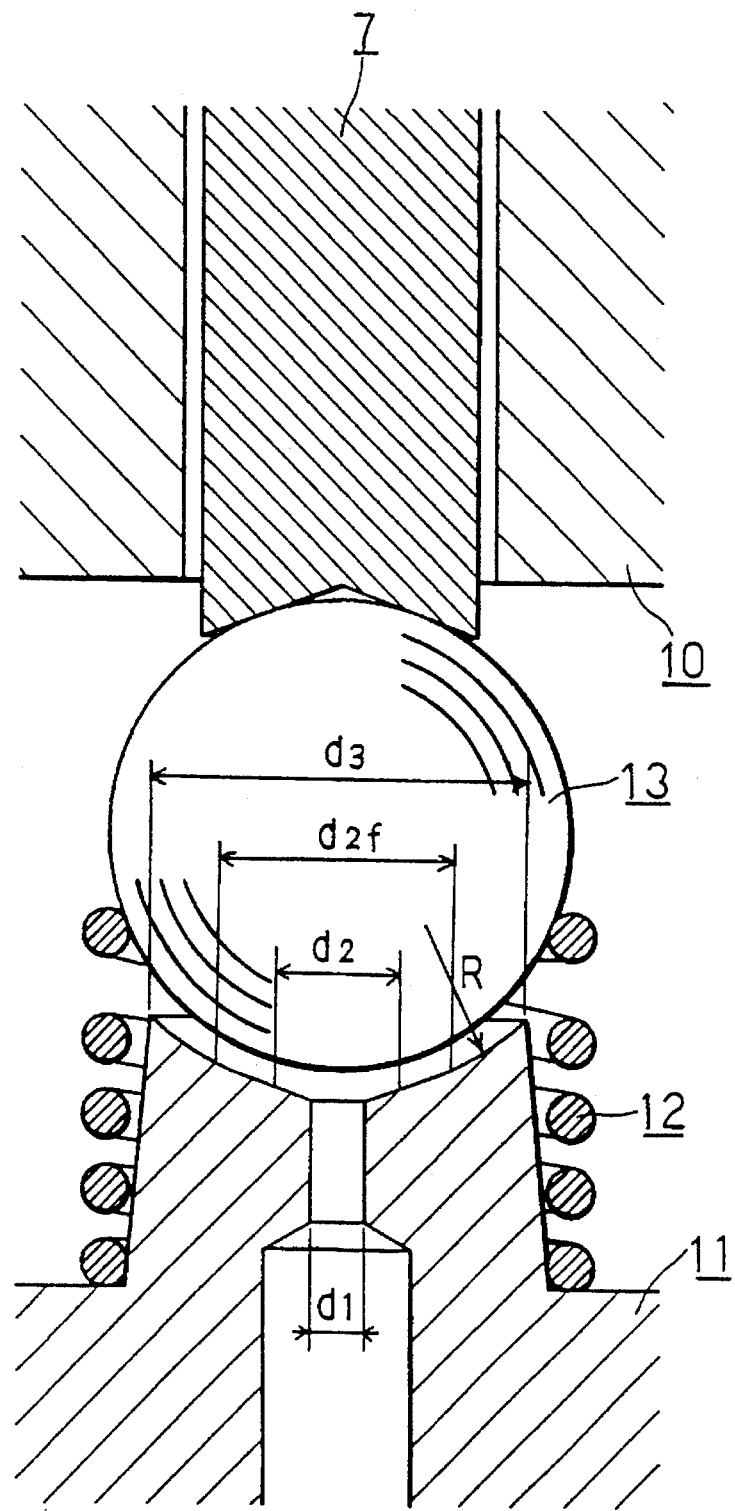
Figure 15:
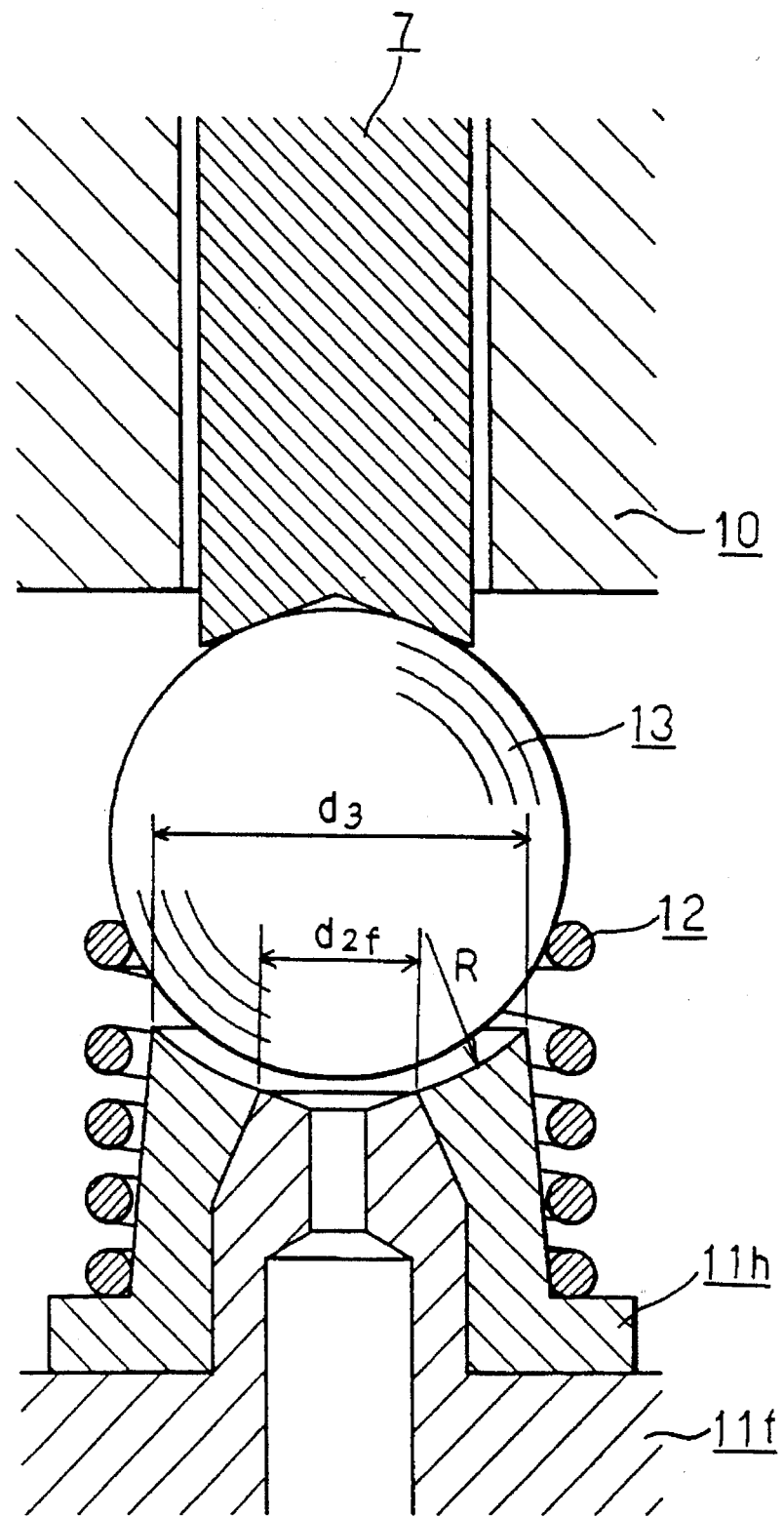
Figure 16:
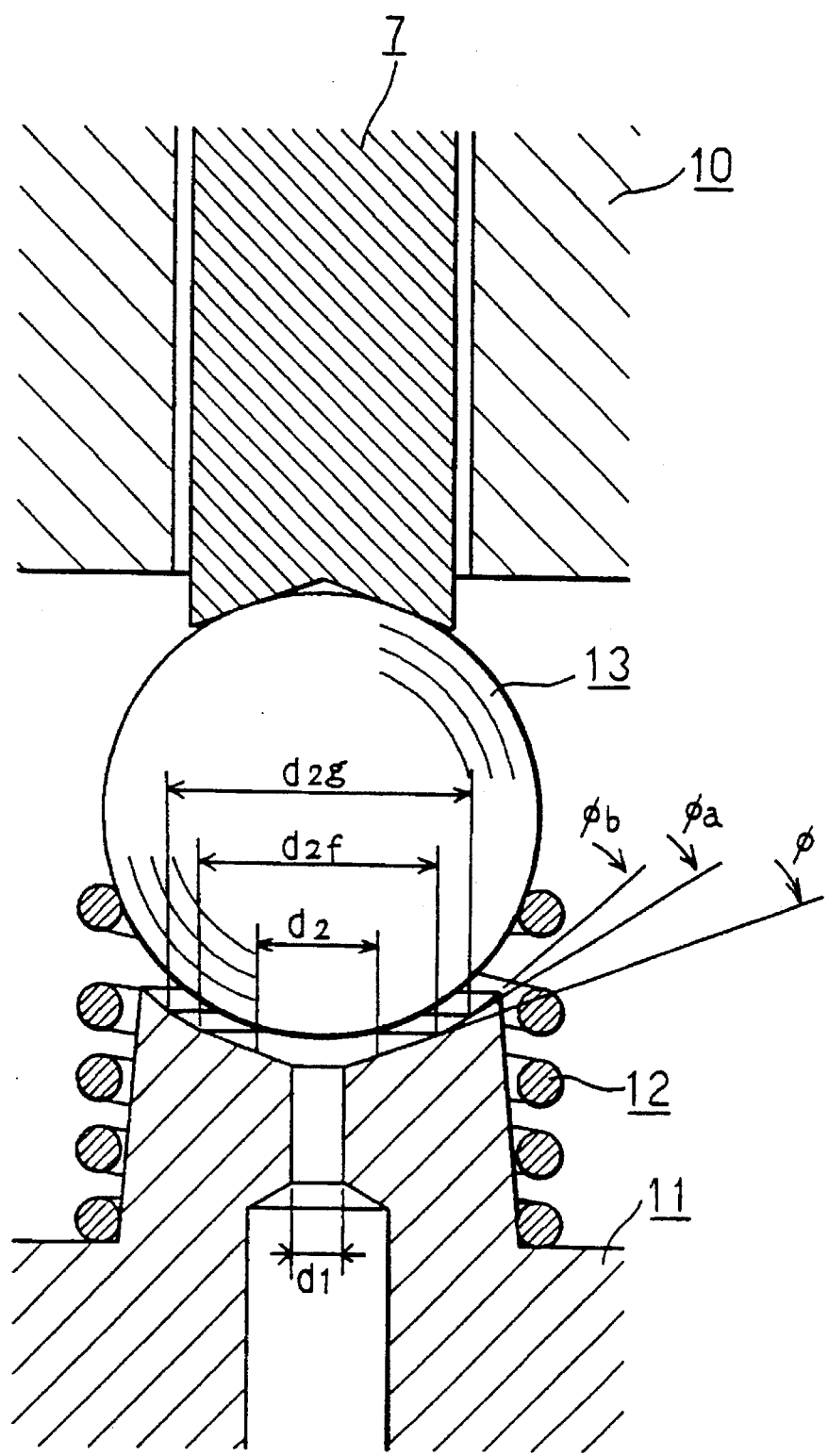
Figure 17:
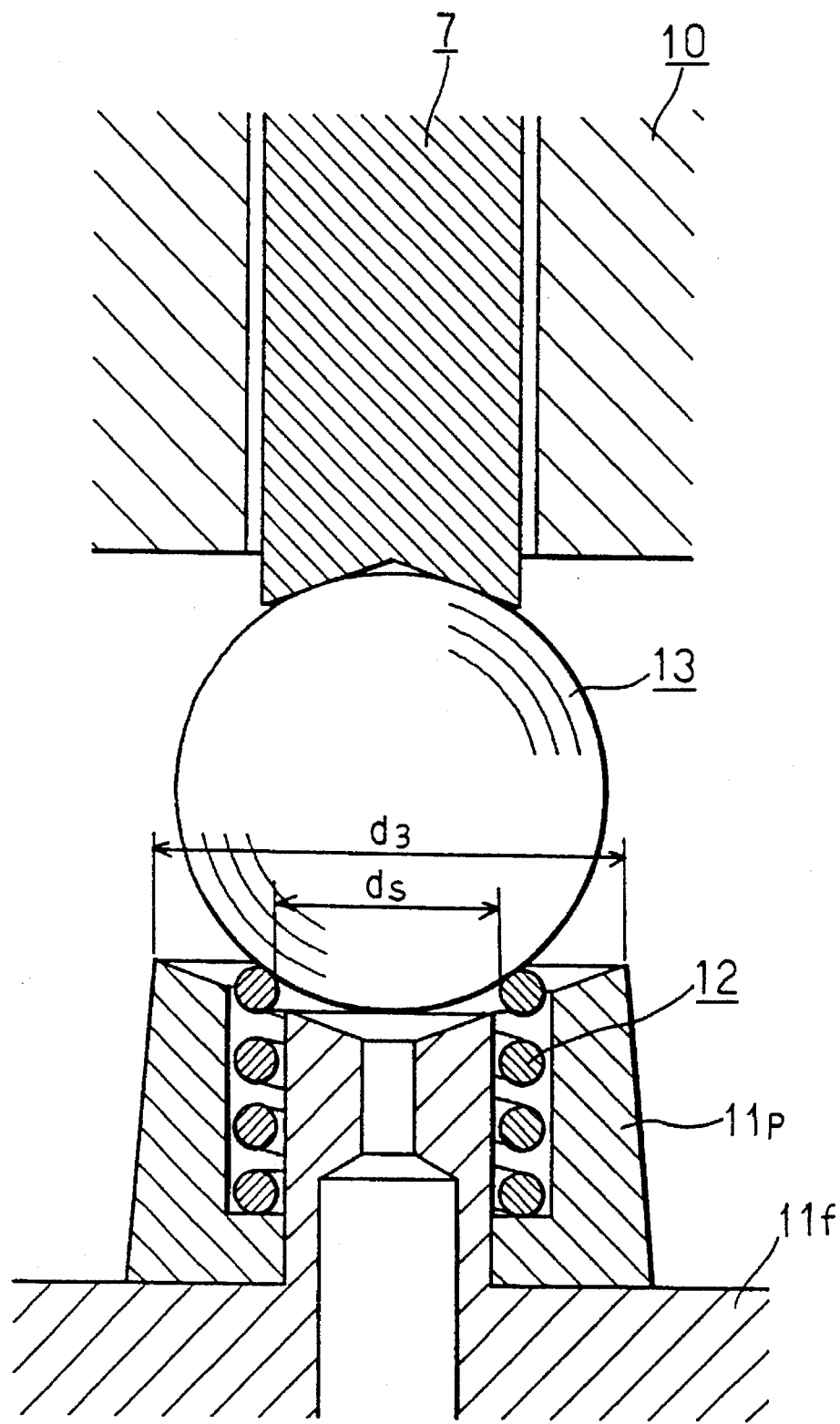
Figure 18:
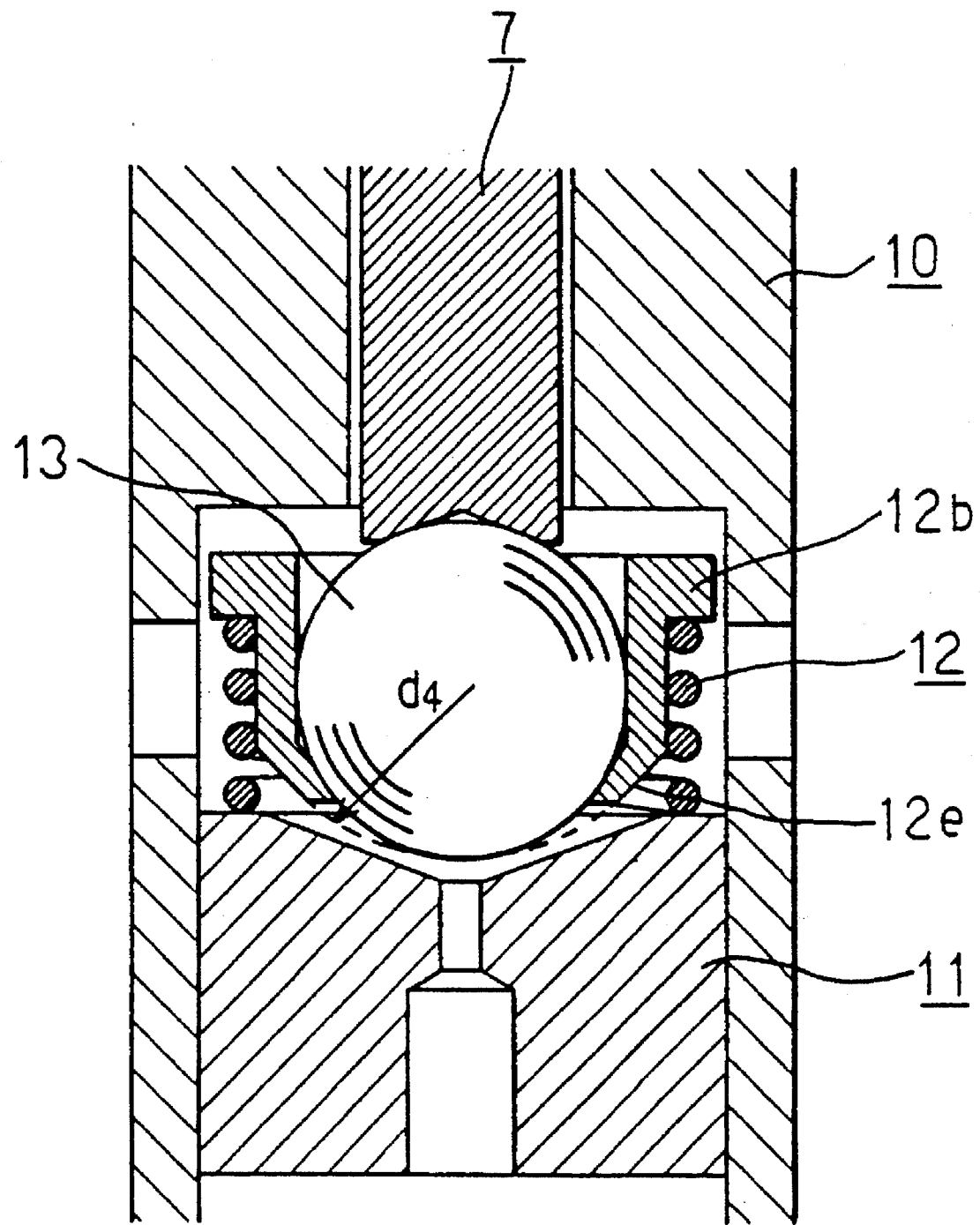

In FIG. 14, the seat configuration outside of $d_{2f}$ (>$d_2$) is in a smooth, spherical sphere concave configuration so that the ball 13 is surrounded, in order to increase the flow velocity of the valve lower surface. This drawing takes curvature to be constant, but an arbitrary curved surface is also acceptable. In FIG. 15, machining such as press-fitting which requires precision of each component is eliminated by depressing the seat valve 11h having the spherical concavity $11_h$ with a spring, and there is moreover no danger of falling out, and productivity is further enhanced. FIG. 16 shows an embodiment where the seat configuration has three steps for a seat configuration which encloses the ball at angles of $\Phi_a$ (<Φ) from $d_{2f}$ (>$d_2$) and $\Phi_b$ (<Φ) from $d_{2g}$ (>$d_2$). In FIG. 16, the taper angles are changed in three steps, but it is also acceptable to increase the number of steps even further. (However, the surfaces of $\Phi_a$ and $\Phi_b$ do not make contact when the ball has contacted the seat surface.) FIG. 17 indicates a case where the spring 12 has been inserted between the seat 11f and an outer-side seat valve 11p; in this way, a large seat outer diameter $d_3$ which is not dependent on the inner diameter $d_s$ of the spring 12 which supports the ball 13 can be ensured. Furthermore, as shown in FIG. 18, the seat portion can be structured without a protruding configuration of tubular shape, and so further enlargement of the effective attracting surface area becomes possible.

Next, consideration will be given to increasing the effective attracting surface area while keeping the seat diameter $d_2$ the same. It is acceptable simply to enlarge the ball diameter D, but because of the relationship: $d_2$=Dcos Φ, it is necessary to enlarge the seat angle Φ according to $\Phi = \cos^{-1}(d_2/D)$; however, if the seat angle Φ is made excessively large, $\Phi = \Phi_{th} = \tan^{-1}(1/\mu)$, where $\Phi_{th}$=Marginal angle of friction and $\mu$=Coefficient of friction, and the ball does not slide over the seat tilted surface.

That is to say, when the ball 13 moves to the lower area of the drawing and the valve closes, if the center of the ball 13 is displaced from the center of the seat 11 and is grounded, the ball 13 cannot slide over the seat surface of the seat 11, and ground displacement cannot be corrected. Consequently, it becomes impossible to make the seat angle Φ exceedingly, large and along with this it becomes impossible as well to make the ball diameter D exceedingly large.

In this regard, the method hereinafter causes the actual attracting surface area to increase with no particular enlargement of the ball diameter D.

Figure 19:
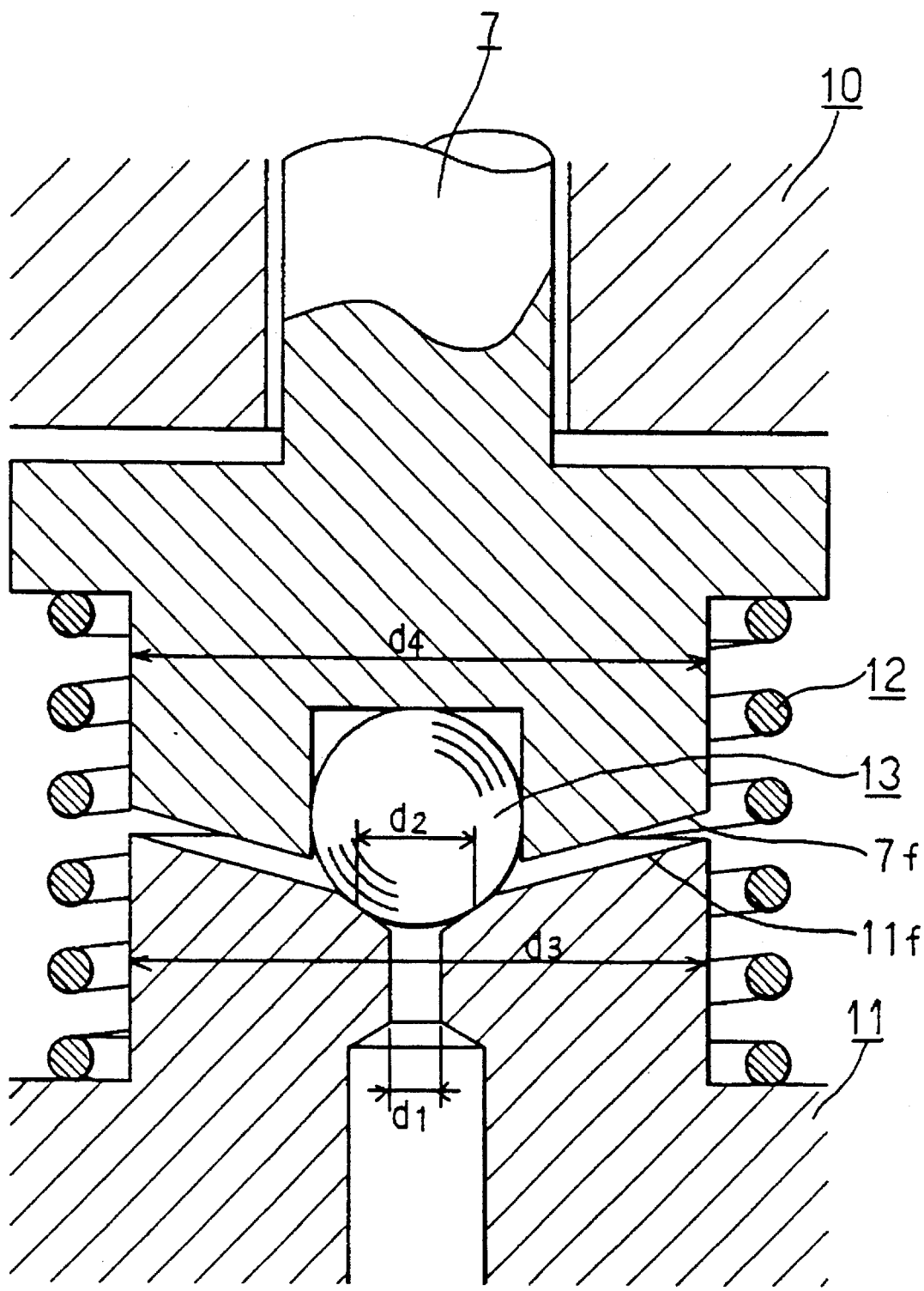

FIG. 18 shows an embodiment where a holder 12b is mounted around the ball 13 and the ball is pressed upwardly via the holder 12b. In this case, the effective attracting diameter $d_4$ is made large, and so the attracting effect is increased; $d_4$ in this case is made to have a configuration enveloping the ball and a portion 12e of the holder 12b facing the seat 11. FIG. 19 shows an embodiment where the ball 13 has been crimped after being press-fit to the lower-end of shaft 7. In this case, the clearance between the shaft lower-end portion 7f and seat surface 11f when the valve is seated should be made as small as possible.

Figure 20:
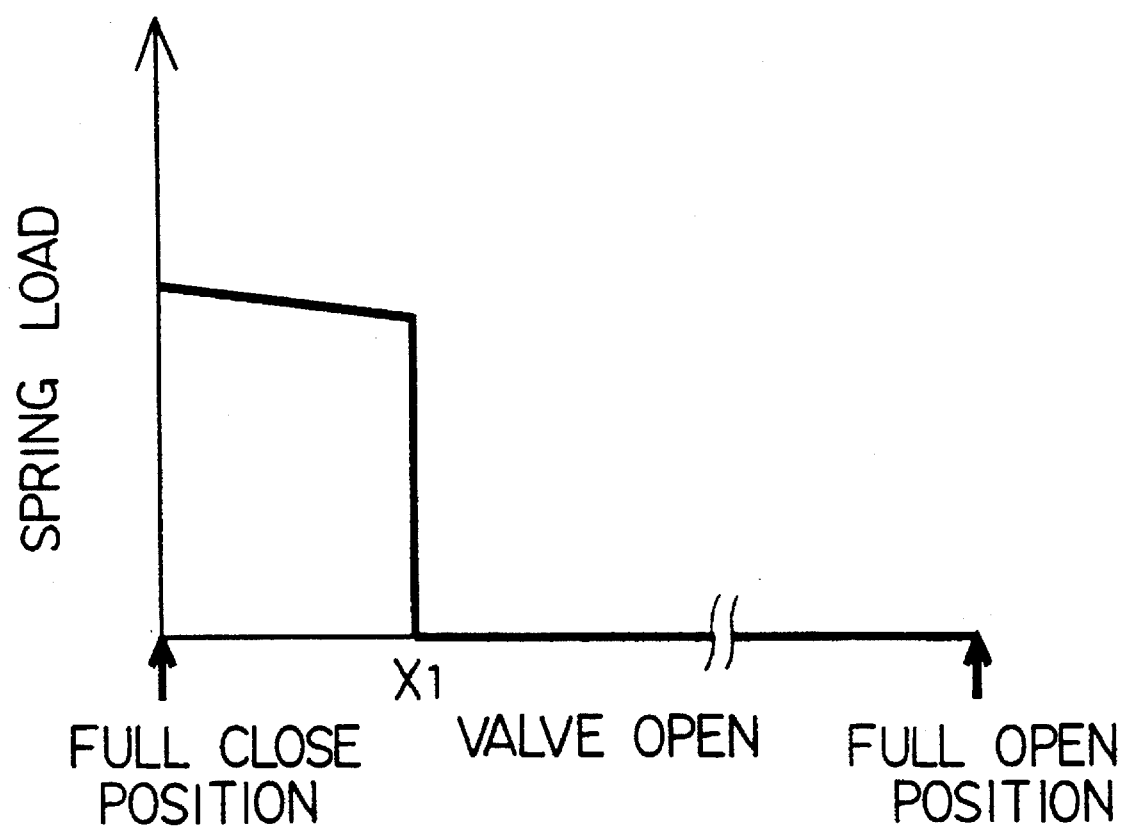
FIG. 20 is a characteristic diagram indicating a relationship between degree of valve opening and spring load.

The spring utilized in descriptions heretofore acts at full opening or closing stroke of the valve, but by making it so that the ball is subjected to the spring load only in the proximity of being seated, as shown in FIG. 20, the spring load when the ball is seated can be established as desired without exerting a great effect on flow control. Consequently, if the set load is enlarged, a sufficient force to reliably open the valve is applied even if the viscous resistance of the sliding portions of the solenoid valve becomes large during cold temperatures and the like, and so operation of the valve becomes even more reliable. Herein, a valve opening $X_1$ at which the spring load is applied which is 0.1 mm or less is acceptable, but a recommended value is approximately 20 to 50 μm.

Figure 21:
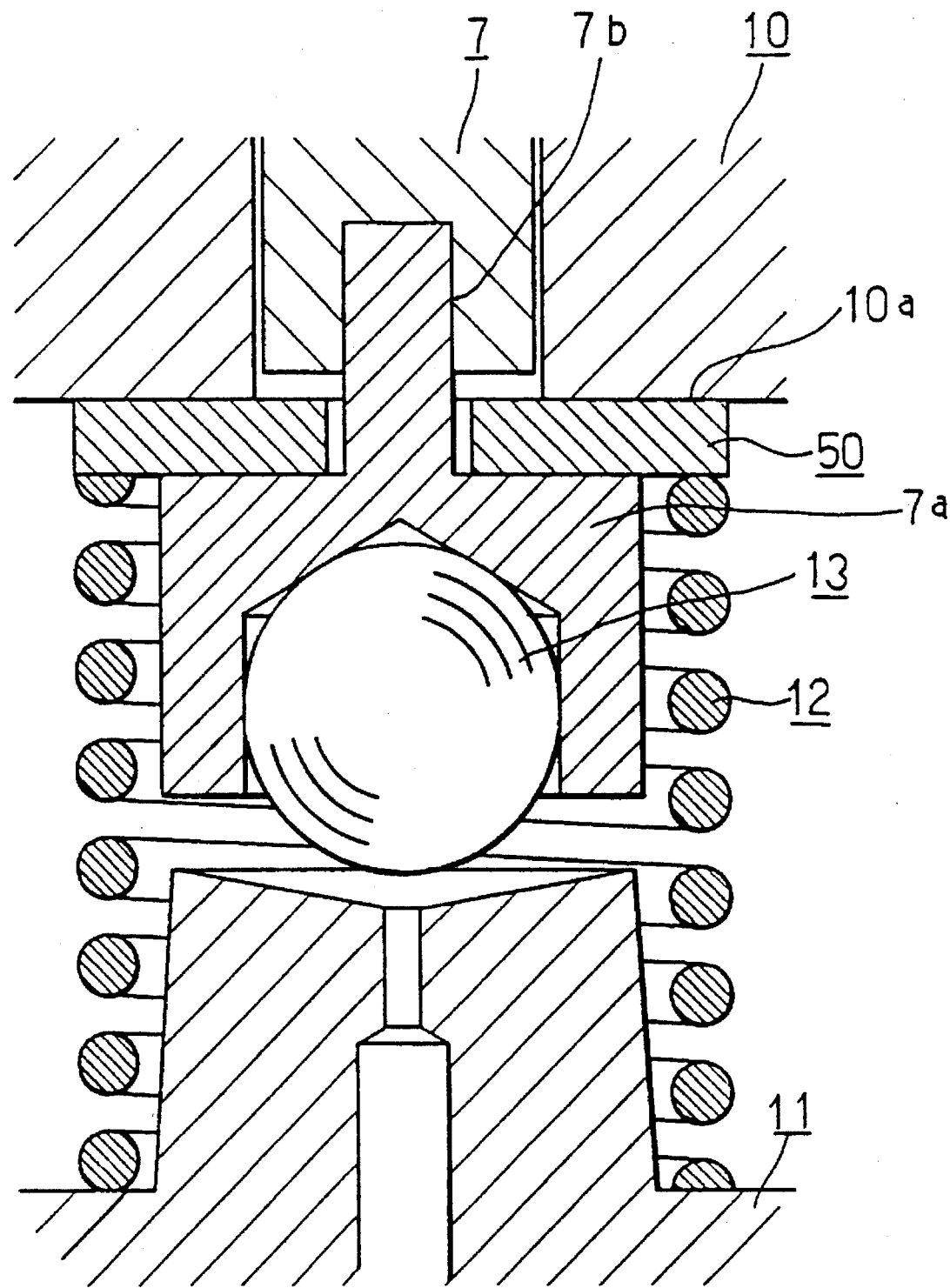

The detailed structure of an embodiment as described above is illustrated in FIGS. 21 through 23. FIG. 21 indicates a state of the valve prior to operation; a guide diameter portion 7b of a holder 7a is press-fit to an end surface of a shaft 7, and a washer 50 of annular configuration is installed therein. The washer 50 contacts an end surface 10a of a guide 10 by a spring 12. A ball 13 is fixed to the holder 7a. When current flows through a coil (not shown), the valve passes from the state shown in FIG. 21 through that in FIG. 22 to form a seal as shown in FIG. 23. That is, a clearance of $X_1$ opens between the end surface 10a of the guide and the washer 50. Next, when current to the coil is terminated, the shaft 7 is pressed by the spring 12 via the washer 50, as shown in FIG. 21, and so when the washer 50 contacts the end surface 10a of the guide, the state indicated in FIG. 23 is obtained. When the washer 50 contacts the guide 10, the spring load comes not to be applied with respect to the shaft 7 making a stroke of $X_1$, and it is possible to make so that the ball 13 and shaft 7 do not make an unnecessary stroke.

Figure 22:
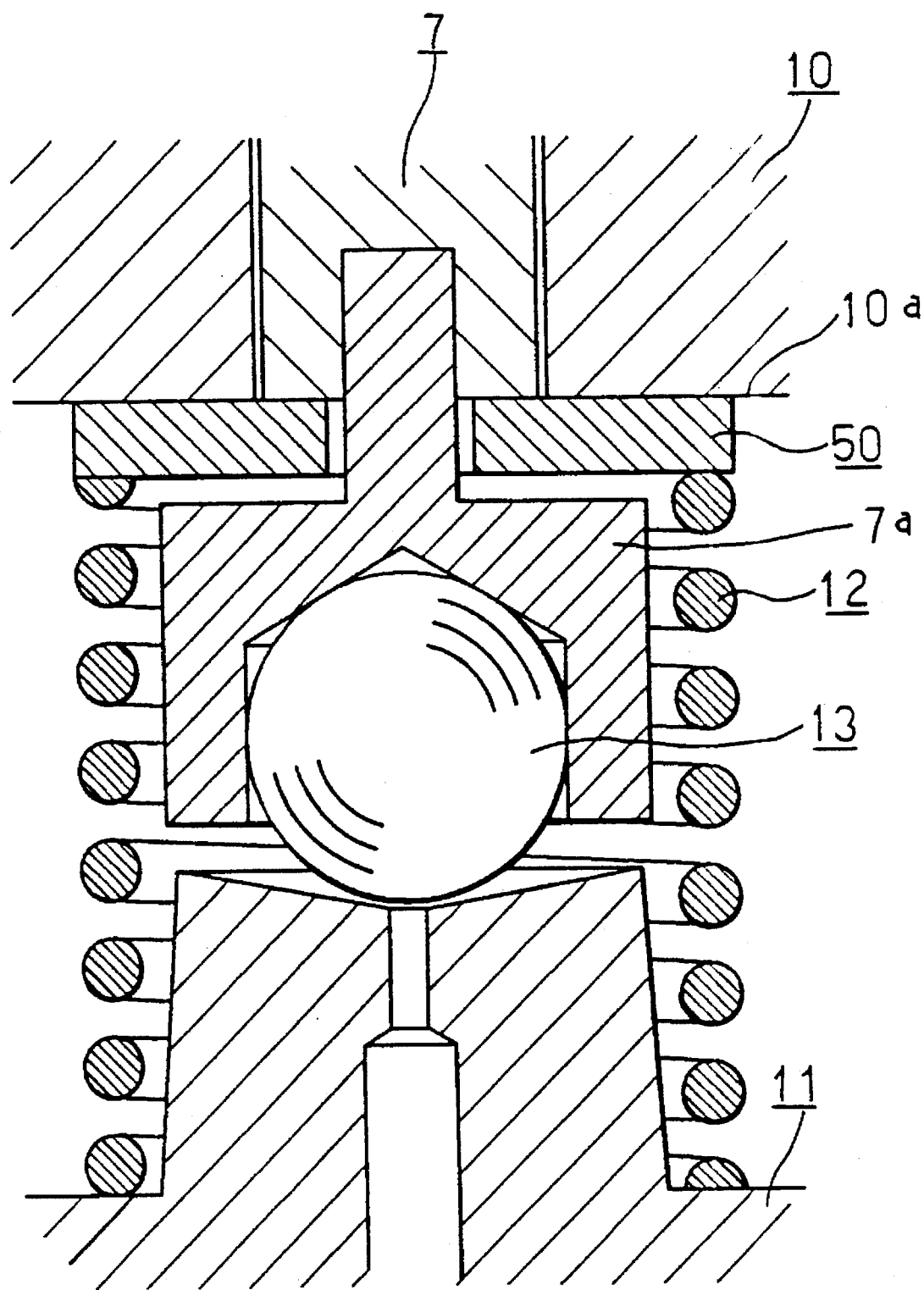
Figure 23:
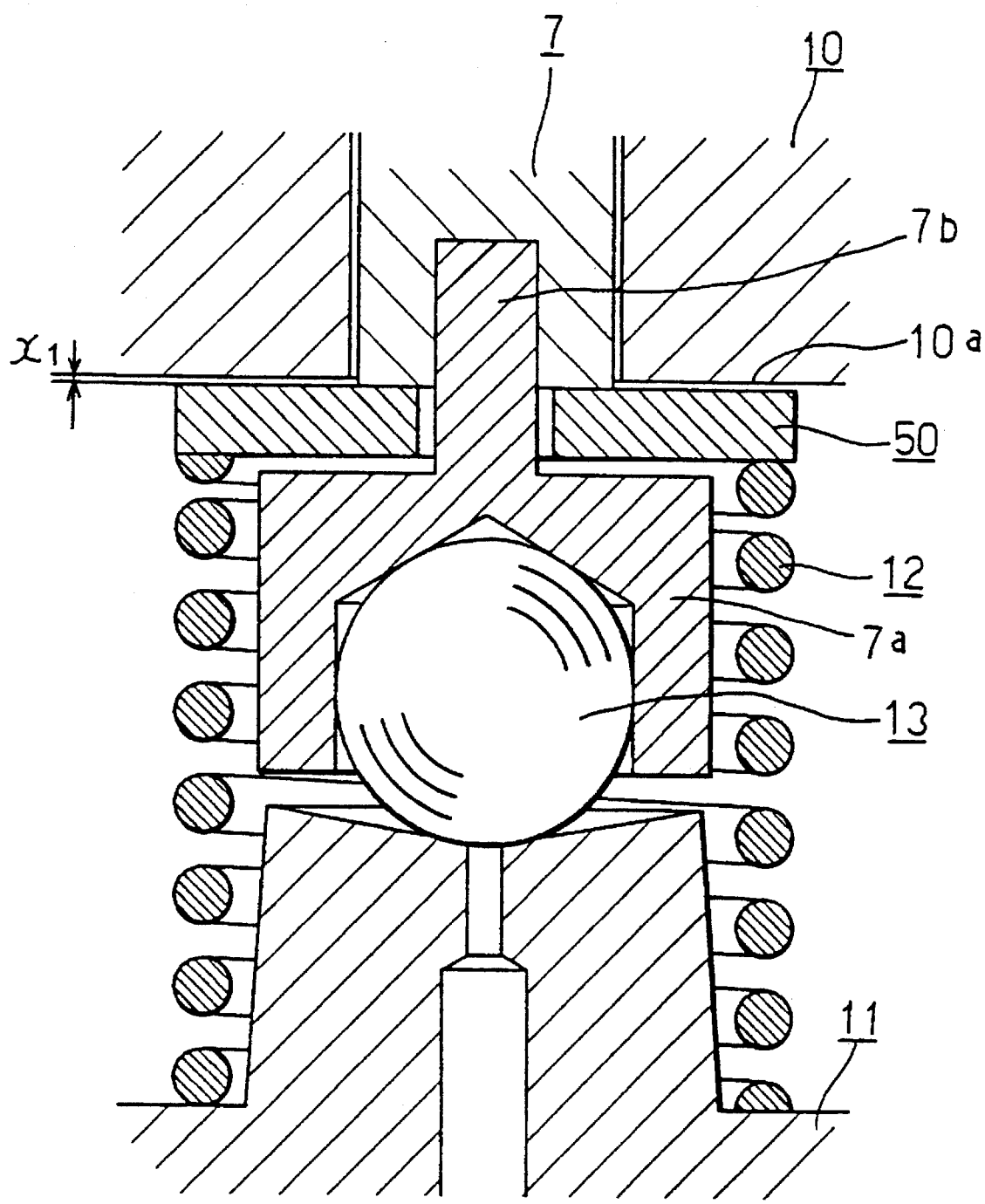
Figure 24:
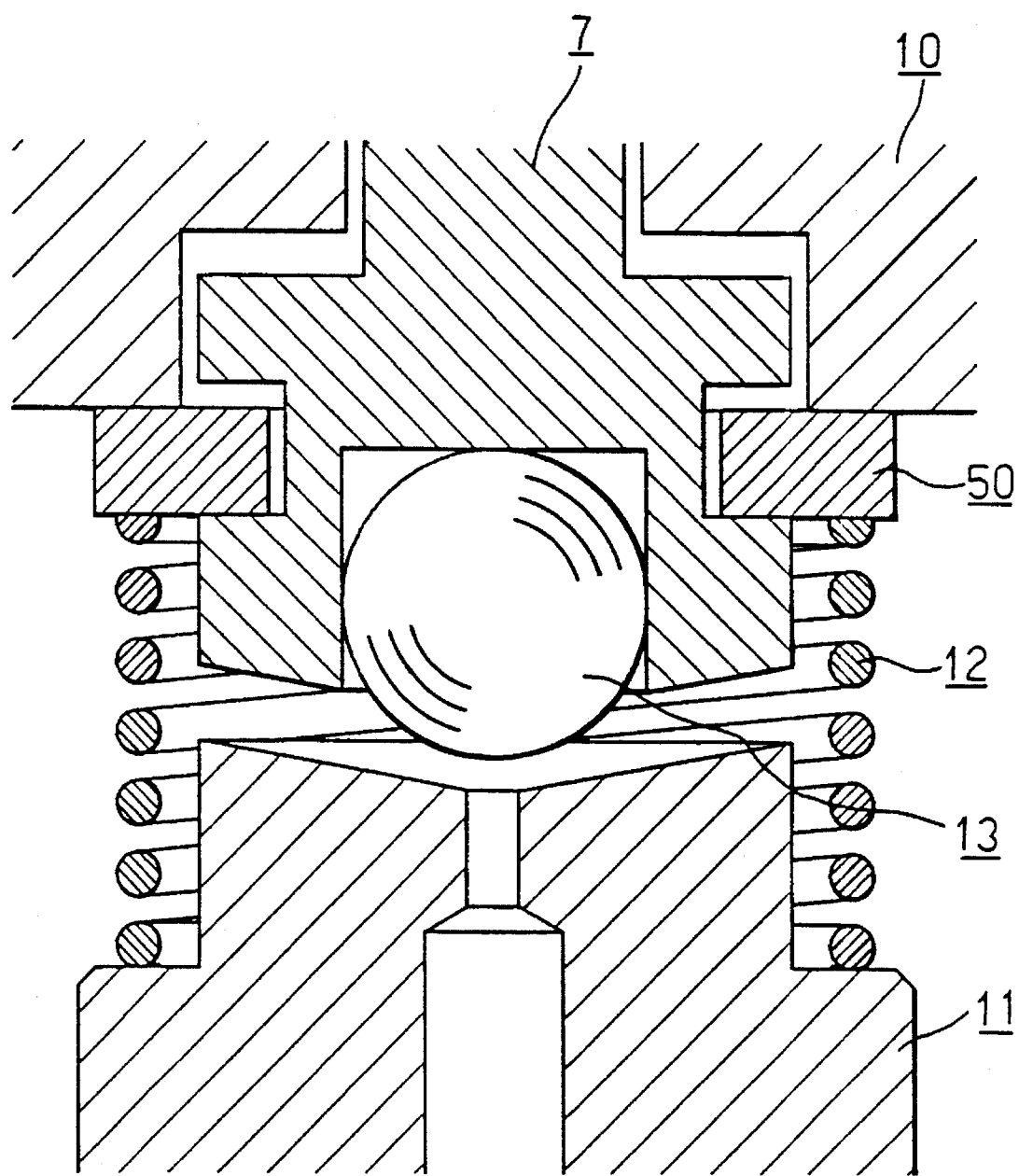
Figure 25:
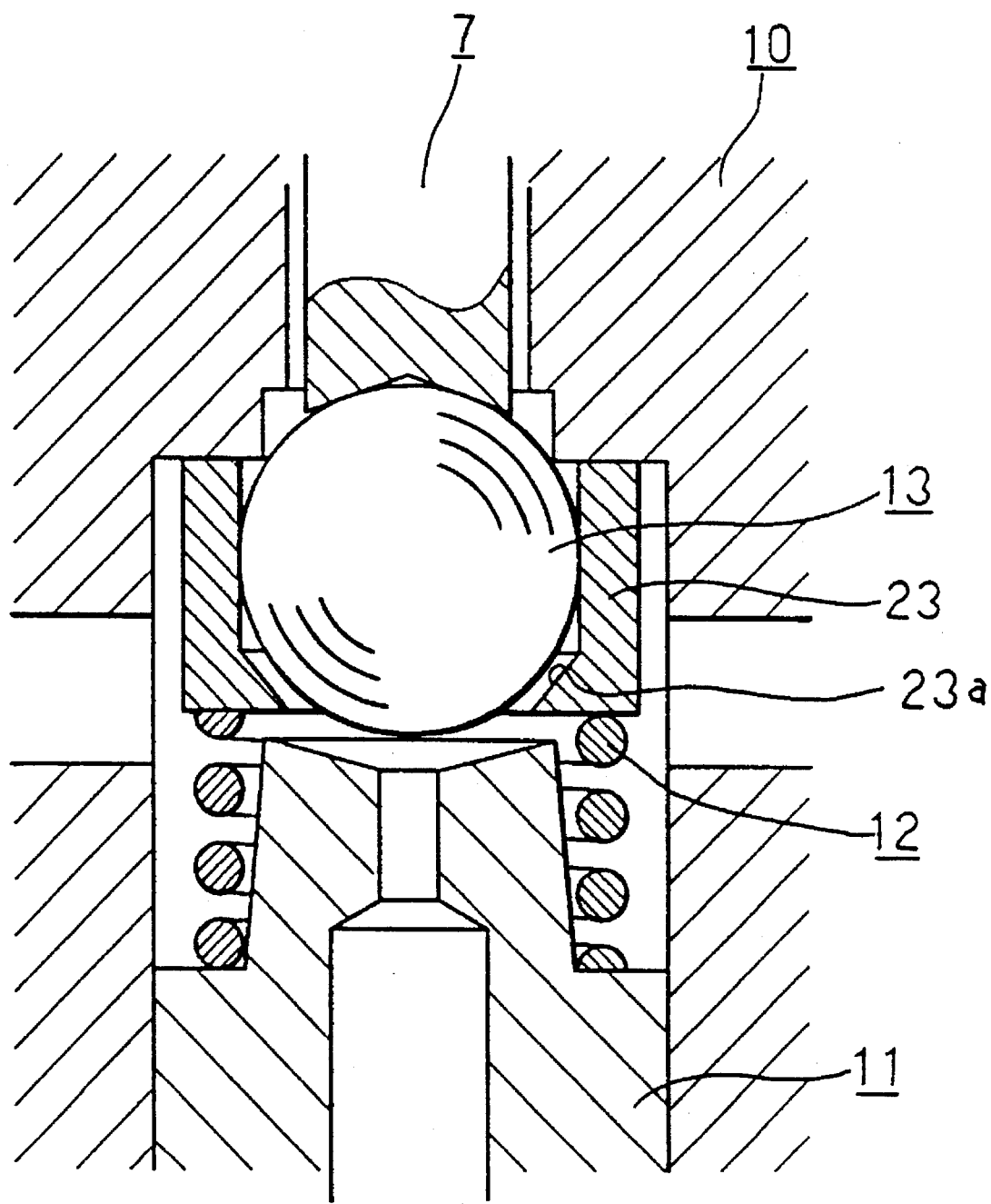
Figure 26:
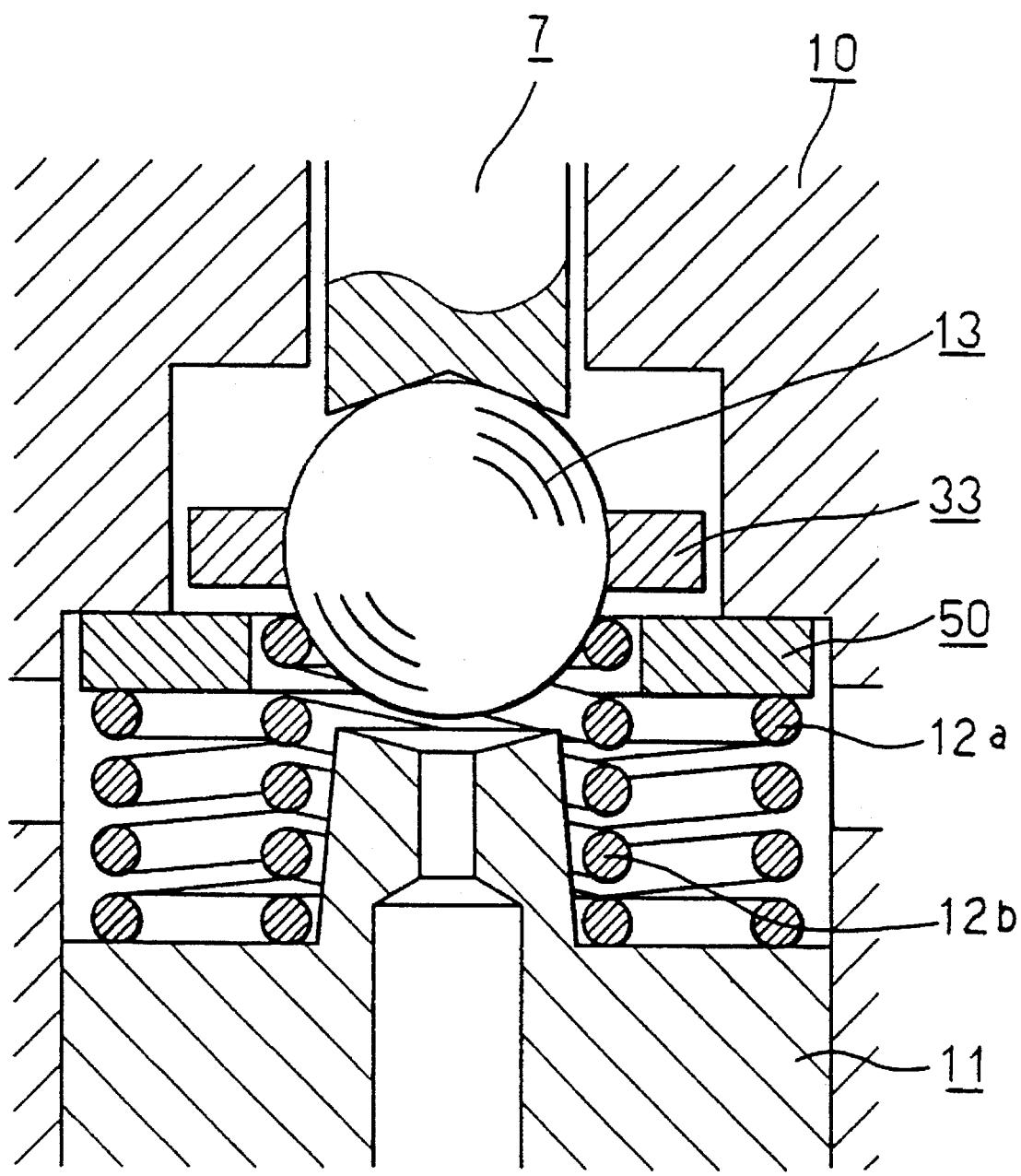

FIG. 24 shows an embodiment where the shaft 7 and holder 7a of FIG. 21 to FIG. 23 have been integrated and similar effects to those of previously-described embodiments are thereby obtained. FIG. 25 shows an embodiment where a ball is freely slidable within a tubular holder 23. A spring 12 presses against a ball 13 via an incline 23a of a holder 23, and when an end surface 23b of the holder contacts the end surface 10a of the guide, spring load is not applied to the ball 13, and so effects similar to those provided by the embodiments shown in FIG. 21 to FIG. 23 can be obtained. FIG. 26 shows an embodiment where an annular holder 33 is integrally fixed to the ball 13. In this case, a spring 12b pressing against the ball 13 is installed in addition to a spring 12a which presses against a washer 50.

Figure 27:
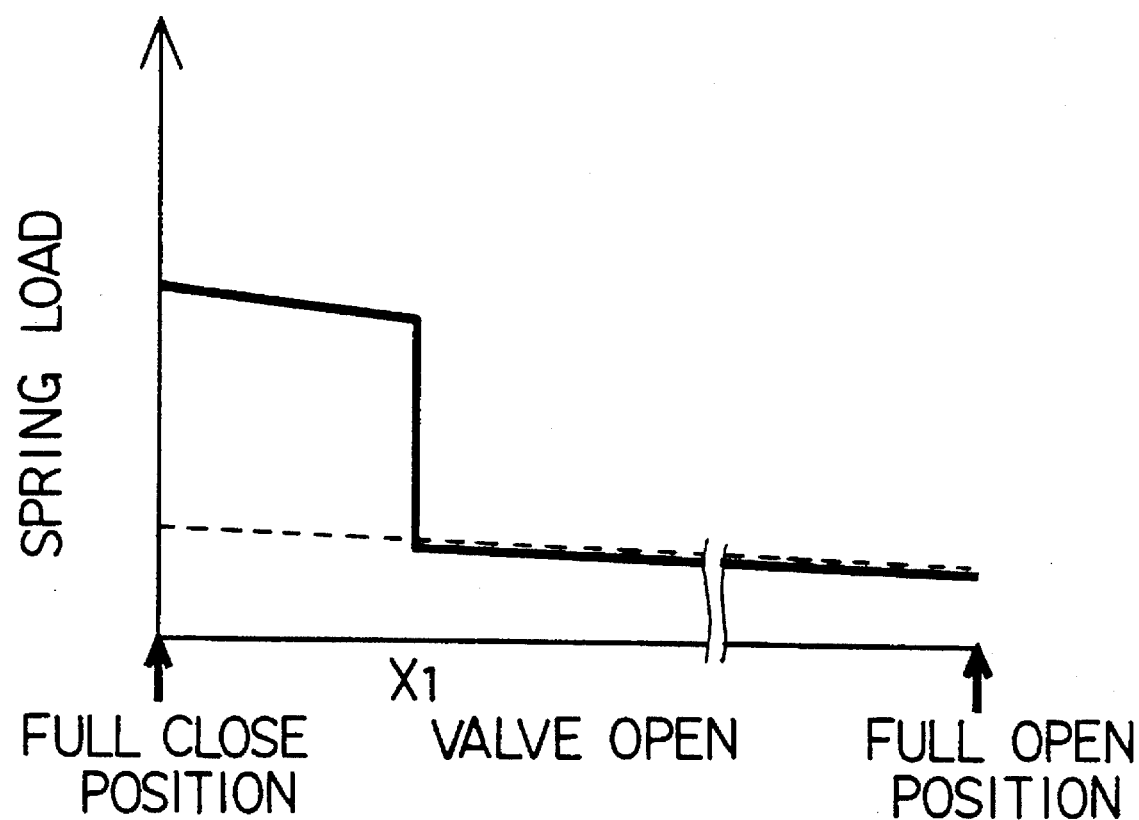
FIG. 27 is a characteristic diagram indicating a relationship between degree of valve opening and spring load.

For the characteristics of FIG. 26, as shown in FIG. 27, the load of the spring 12a and the spring 12b is applied in the displacement interval of 0 to $X_1$, and at a displacement of $X_1$ or more, only the load of the spring 12b is applied. For the load of the spring 12b at this time, if the spring's characteristics conform to the broken line shown in FIG. 27, there is no problem in controlling flow through the valve. Additionally, establishment of a similar spring is also possible for the structures indicated in FIG. 21 to FIG. 23, FIG. 24 and FIG. 25.

An article utilizing the attraction phenomenon of a valve described heretofore ultimately has limited the flow into the valve by restricting the degree of opening of the valve, and has alleviated hydraulic pulsation in hydraulic piping generated by opening and closing of the valve by alleviating the amount of change of flow.

Figure 28:
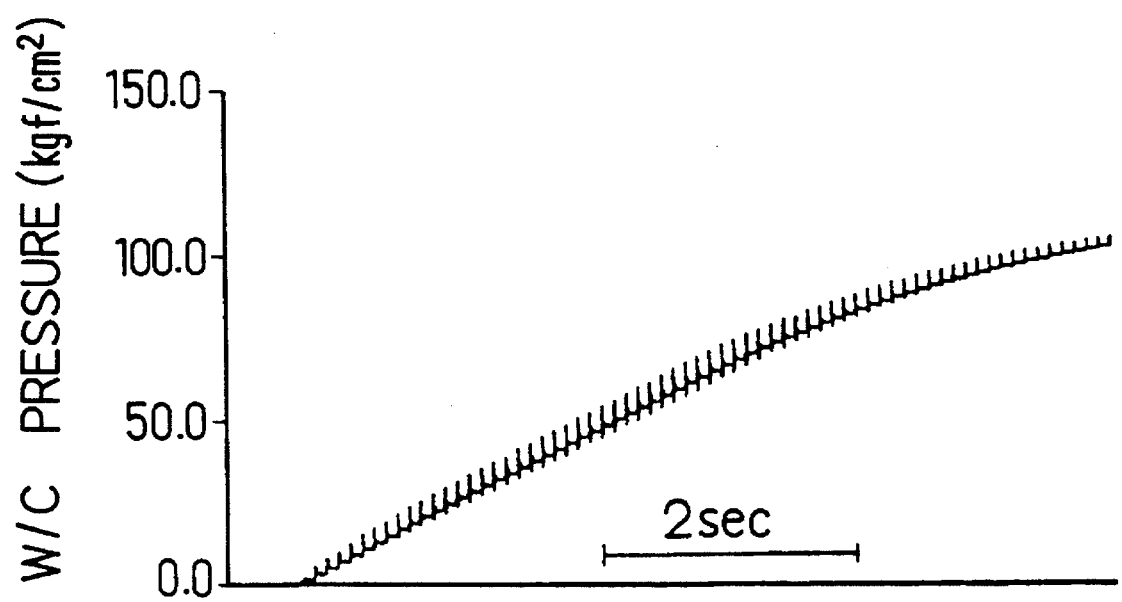
FIG. 28 is a time chart which indicates change in W/C pressure.

Utilizing the viscous resistance of a fluid is effective as a method for retarding the opening and closing speed of a valve. As a structure thereof, there exists the method of reducing the clearance between the plunger 8 and sleeve 5 or the method of reducing the clearance between the guide 10 and the shaft 7 by eliminating the communicating holes in the upper and lower rooms of the plunger indicated in FIG. 1; as shown in FIG. 28, effective results in alleviating hydraulic pulsation have also been produced experimentally, and the method is effective.

Furthermore, to avoid any excessive increase in viscous resistance due to an increase in the fluid's coefficient of viscosity at low temperatures, as shown in FIG. 29, it is preferable to make the upper and lower communicating holes of the plunger 8 into orifice restrictors 8e with no dependency on viscosity due to the temperature of the fluid, to form tubular protrusions 8c and 8d to maintain the clearance of the plunger 8 and sleeve 5 on the outer peripheral surface, and thereby to eliminate the influence of shear resistance due to viscosity of the fluid on the side surfaces of the plunger 8 and sleeve 5, and moreover the fluid flow between the upper and lower surfaces of the plunger 8 is interrupted.

Figure 30:
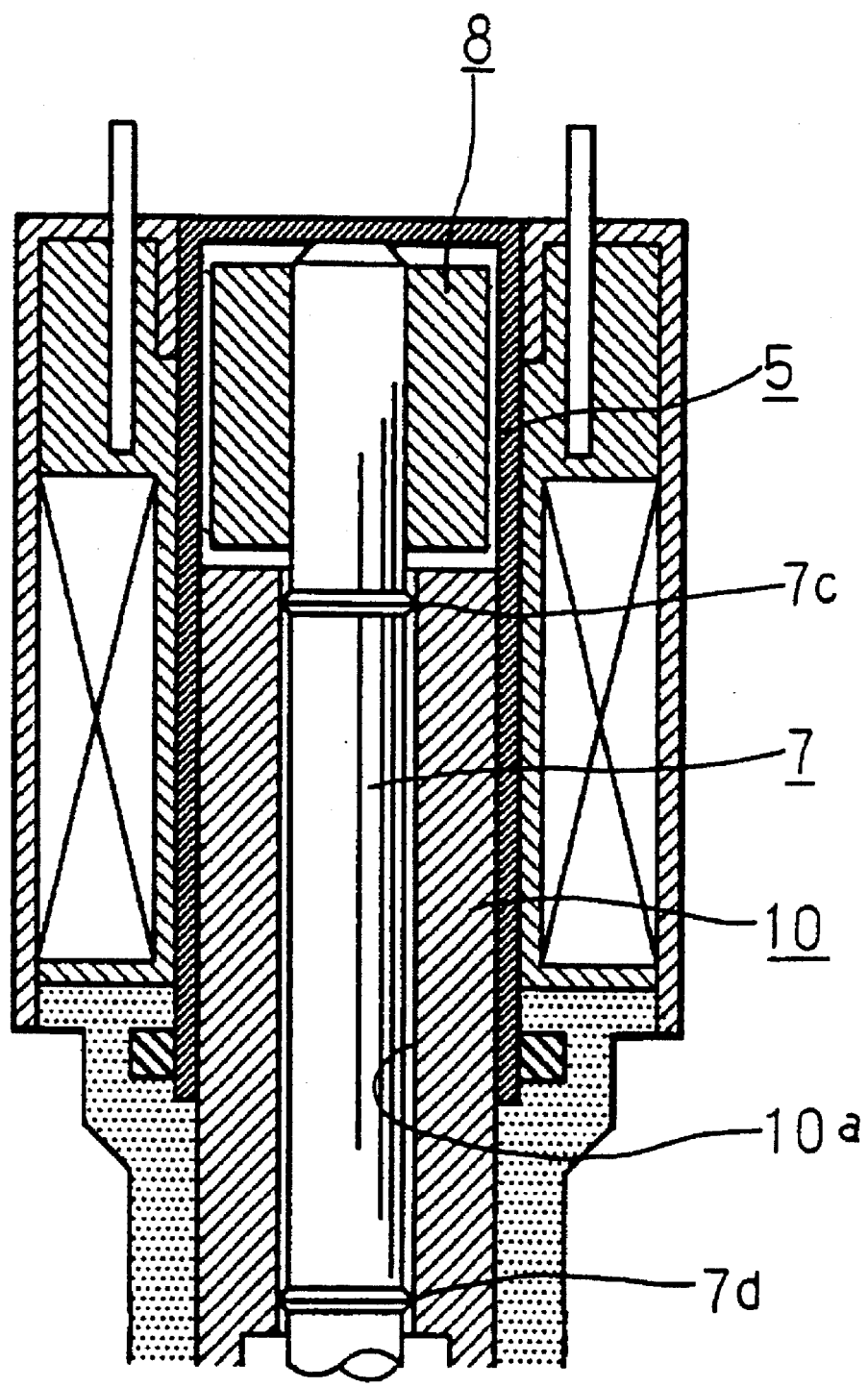

Additionally, as shown in FIG. 30, it is also possible to provide a similar protrusion 7c or 7d on the outer periphery of the shaft 7 and make the protrusion 7c or 7d an orifice restrictor in conjunction with the guide inner-diameter portion 10a. Forming a protrusion on the shaft 7 is more effective than forming one on the plunger 8. The reason for this is that whereas the loss of magnetism becomes greater when a protrusion is formed on the plunger 8 because the void length above the electromagnetic circuit becomes longer, the shaft 7 has no such restriction, and the centering performance of the shaft 7 is also improved. There is no need to make the protrusion configuration triangular in cross-section, and it is acceptable to adopt a configuration which is not subject to the influence of viscosity.

Figure 31:
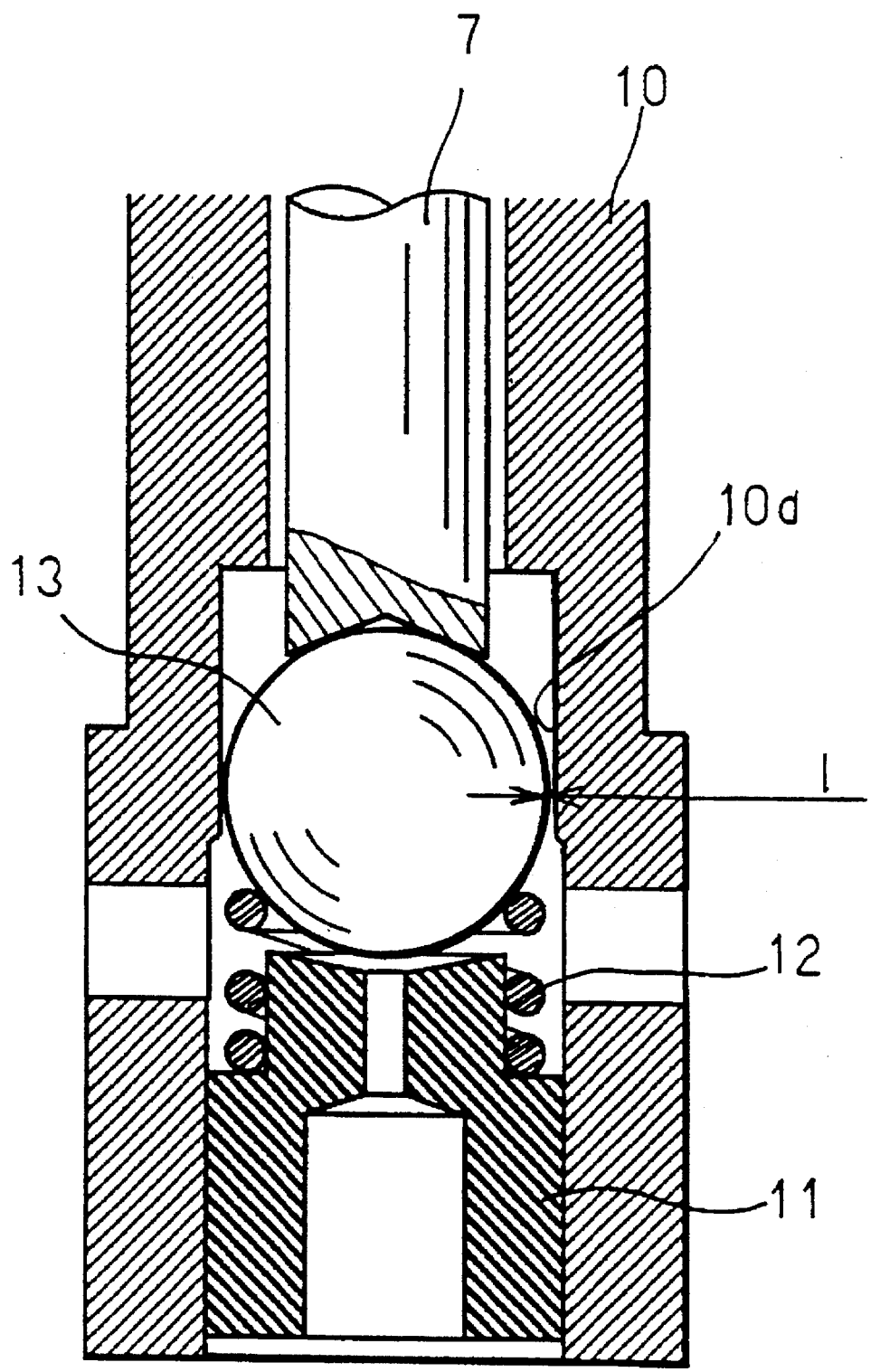

Another embodiment is shown in FIG. 31; in this embodiment, the fluid flow is restricted with ball 13 and the inner surface 10d of the guide 10. The benefits of this embodiment are that, because the ball 13 is an ordinary bearing ball and accuracy is maintained, it is acceptable to machine only the guide inner diameter with high accuracy; also, when the ball 13 can move freely with respect to the shaft 7, the ball 13 is reliably guided to the seat even when the clearance between the shaft 7 and the guide inner-diameter portion 10d is large, and so unnecessary radial movement is prevented; moreover, flow-control performance is improved. In FIG. 31, a clearance between the ball 13 and guide 10 of 0.1 mm or less is preferred.

The above-described structures for restricting fluid flow to retard valve opening and closing speed may be understood to be sliding speed reducing members.

Figure 32:
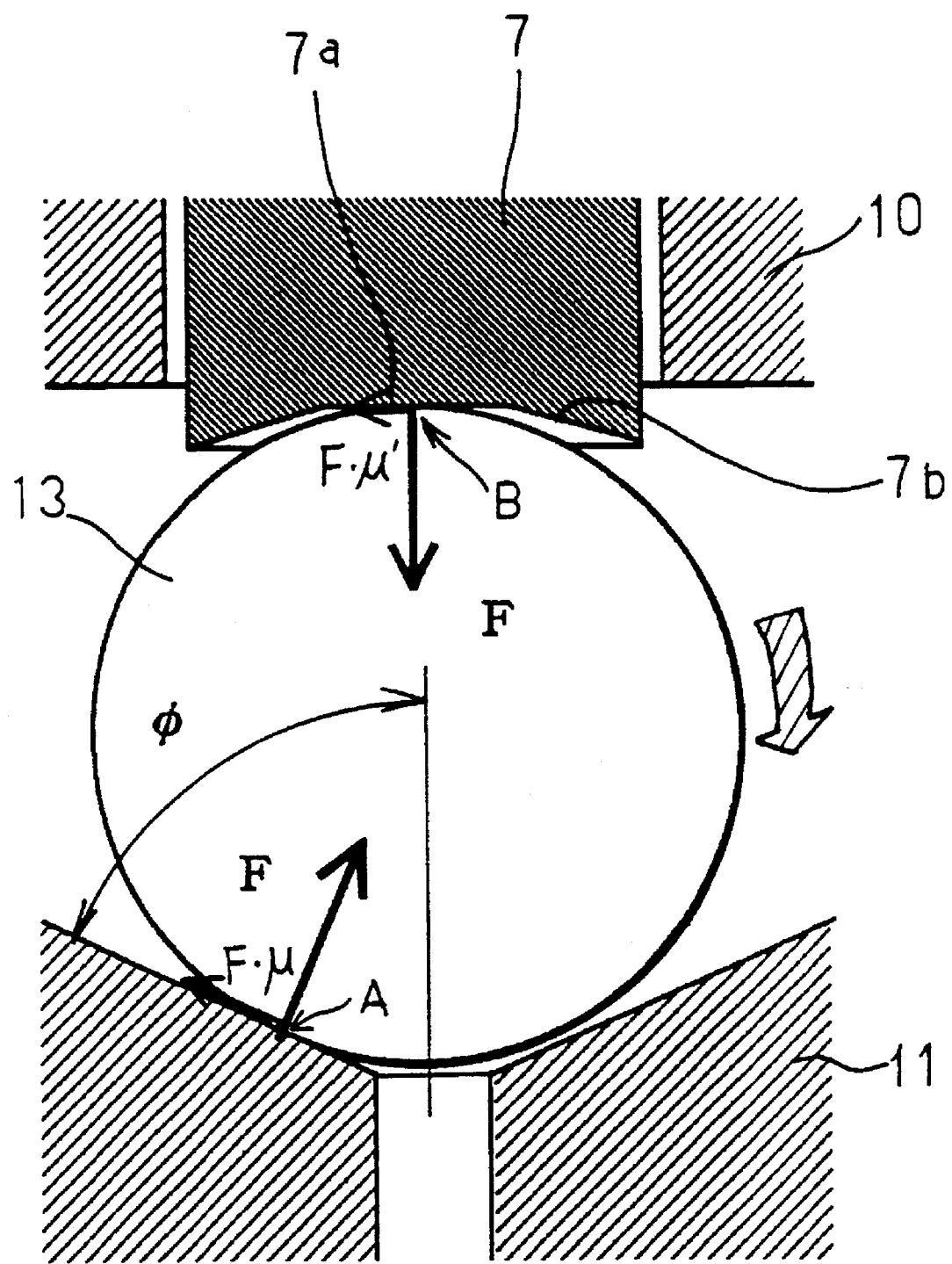

Earlier it was noted that the marginal friction angle $\Phi_{th}$ between the ball 13 and seat 11 depends on the coefficient of friction between the ball and seat, but as shown in FIG. 32, if the coefficient of friction $\mu'$ between the shaft 7 and ball 13 is made smaller than the coefficient of friction $\mu$ between the ball 13 and seat 11, slippage is generated at point B of the shaft 7 and the ball 13 rolls at point A of the seat, and so the ball 13 can move over the seat 11 with no entrapment even if the seat angle $\Phi$ is enlarged, and a reliable seal is provided. This can provide a major advantage with a simple structure using a shaft 7, ball hole 13, and seat 11 wherein a reliable seal is produced even if the ball diameter shape D is enlarged while maintaining the seat diameter shape $d_2$ and the seat angle $\Phi$ is enlarged, and the ball diameter shape can be enlarged to cause the attracting surface area to be enlarged without enlarging the receiving-pressure surface area, i.e., the required drawing force.

Herein, to lower the coefficient of friction $\mu'$ between the shaft 7 and ball 13, it is acceptable to coat the ball-contacting surface of the shaft 7 with a low-friction material such as Teflon serces or the like, or if the shaft 7 itself is made to be a resin material having a low coefficient of friction ($\mu \approx 0.14$), then in addition to the above-described effects, the movable portions become lighter in weight, and vibration during electromagnetic operation can be alleviated. Additionally, in FIG. 32 the ball 13 contacts the flat portion 7a of the shaft, but equivalent effects are obtained even when if contacts the tilted surface 7b.

Moreover, by making the lower end of the shaft 7 correspond to the configuration of the ball 13, it becomes possible to lower the surface pressure received by the shaft 7 from the ball 13 and to thereby improve durability. Additionally, the plunger presses the ball via the shaft, but it is also acceptable for the plunger to press the ball directly.

As described above, the solenoid valve according to the present invention is effective as a flow control valve of a hydraulic pressure apparatus performing a pressure increase control operation, and is particularly applicable to such a valve used as a two-position valve or a three-position valve in an ABS, because the pressure increase can be performed while limiting the hydraulic pulsation, and it is thereby possible to improve the controllability of the ABS.

What is claimed is:

1. A solenoid valve disposed between a master cylinder of a vehicle and a wheel cylinder of a wheel of said vehicle for performing a pressure increase control for an anti-lock brake operation, said valve comprising:

a moving member for moving responsive to electromagnetic power acting thereon, said moving member having two ends;

a communication interruption member, having a configuration of a spherical surface, for moving responsive to movement of said moving member;

a seat member having a tapered surface as a contacting surface, for interrupting a supply of fluid from said master cylinder to said wheel cylinder side when a portion of the configuration of a spherical surface on said communication interruption member is in contact therewith; and pressing means for pressing said communication interruption member in the direction away from said seat member;

wherein while said communication interruption member moves from a state in which said communication interruption member is pushed by said moving member and is in contact with said seat member to a state in which said communication interruption member separates from said seat member by a pressing power of said pressing means when a pushing power by said moving member disappears, said communication interruption member is attracted toward said seat member against pressing force of said pressing means by means of a negative pressure which is formed only when the fluid flows through an area between said communication interruption member and said seat member and thereby flow of said fluid which flows through the area between said communication interruption member and said seat member is restricted.

2. A solenoid valve according to claim 1, wherein said solenoid valve is a valve for a pressure increase use of an anti lock brake use.

3. A solenoid valve according to claim 1, wherein said solenoid valve has a structure for causing both of said ends of said moving member to be subject to a same fluid pressure.

4. A solenoid valve according to claim 1, wherein the tapered surface of said seat member is a concave configuration of a sphere so that said communication interruption member is surrounded by said seat member outside of a point said seat member contacts said communication interruption member.

5. A solenoid valve according to claim 4, wherein a friction coefficient value between said communication interruption member and moving member is smaller than that between said communication interruption member and the tapered surface of said seat member.

6. A solenoid valve according to claim 4, wherein the ratio of the spherical surface diameter of the communication interruption member to the seat diameter $K=D/d2$ is selected to $K>2.2$ and the parameter $Z=d3/d2$ regarding the length of a seat surface at the tapered surface of the seat member is selected to $Z>1.9$, in the case where specifications of the solenoid valve are expressed as seat hole diameter at the tapered surface of the seat member: $d1$, seat diameter: $d2$, spherical surface diameter of the communication interruption member: $D$, seat angle: $\Phi(=\cos^{-1}(d2/D))$, and seat end face diameter: $d3$.

7. A solenoid valve according to claim 6, wherein said seat hole diameter $d1$ is selected to $d1>\Phi 0.7$ mm, and said seat diameter $d2$ is selected to $d2>\Phi 0.76$ mm.

8. A solenoid valve according to claim 7, wherein said seat hole diameter $d1$ is selected to $d1>\Phi 0.76$ mm.

9. A solenoid valve according to claim 6, wherein said pressing means is spring, and the set load thereof is selected within a range of 150 g to 900 g.

10. A solenoid valve according to claim 1, wherein the tapered surface has a multi-step configuration.

11. A solenoid valve according to claim 1, wherein said pressing means is housed inside said seat member.

12. A solenoid valve according to claim 1, further comprising:

a holder containing said communication interruption member, wherein said pressing means presses said communication interruption member via said holder, and said pressing means presses said communication interruption member only in the proximity that said communication interruption member is seated on said seat member.

13. A solenoid valve according to claim 12, wherein said pressing means further includes a second pressing means which directly presses said communication interruption member.

14. A solenoid valve according to claim 1, wherein said moving member provides a sliding speed reducing member so as to reduce a sliding speed thereof.

15. A solenoid valve according to claim 1, wherein the ratio of the spherical surface diameter of the communication interruption member to the seat diameter $K=D/d2$ is selected to $K>2.2$ and the parameter $Z=d3/d2$ regarding the length of a seat surface at the tapered surface of the seat member is selected to $Z>1.9$, in the case where specifications of the solenoid valve are expressed as seat hole diameter at the tapered surface of the seat member: $d1$, seat diameter: $d2$, spherical surface diameter of the communication interruption member: $D$, seat angle: $\Phi(=\cos^{-1}(d2/D))$, and seat end face diameter: $d3$.

16. A solenoid valve according to claim 15, wherein said seat hole diameter $d1$ is selected to $d1>0.7$ mm, and said seat diameter $d2$ is selected to $d2>\Phi 0.76$ mm.

17. A solenoid valve according to claim 1, wherein said pressing means presses said communication interruption member only in the proximity that said communication interruption member is seated on said seat member.

18. A solenoid valve according to claim 17, further comprising:

an additional pressing means for pressing said communication interruption member in the direction away from said seat member;

wherein said pressing means and said additional pressing means press said communication interruption member when said communication interruption member is proximate to said seat member.

19. A solenoid valve according to claim 18, wherein one of said pressing means is for pressing said communication interruption member when said communication interruption member is within a first range proximate to said seat member, and both of said pressing means are for pressing said communication interruption member when said communication interruption member is within a second range proximate to said seat member.

20. A solenoid valve according to claim 18, wherein said pressing means and said additional pressing means are coil springs coaxially disposed relative to one another.

21. A solenoid valve according to claim 1, wherein said moving member and said communication interruption member are discrete from one another.

22. A solenoid valve according to claim 1, wherein said moving member and said communication interruption member are not bonded to one another.

* * * * *